(12) United States Patent
Go et al.

(10) Patent No.: US 11,572,992 B2
(45) Date of Patent: Feb. 7, 2023

(54) LAMP FOR VEHICLE

(71) Applicant: SL Corporation, Daegu (KR)

(72) Inventors: Dong Hyun Go, Gyeongsan-si (KR);
Hyo Jin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/565,041

(22) Filed: Dec. 29, 2021

(65) Prior Publication Data
US 2022/0205603 A1    Jun. 30, 2022

(30) Foreign Application Priority Data

Dec. 30, 2020    (KR) .................. 10-2020-0187862

(51) Int. Cl.
| | |
|---|---|
| *F21S 41/151* | (2018.01) |
| *B60Q 1/00* | (2006.01) |
| *F21W 102/13* | (2018.01) |
| *F21W 102/10* | (2018.01) |
| *F21W 102/17* | (2018.01) |

(Continued)

(52) U.S. Cl.
CPC .......... *F21S 41/151* (2018.01); *B60Q 1/0041* (2013.01); *B60Q 1/0047* (2013.01); *B60Q 1/0058* (2013.01); *F21W 2102/10* (2018.01); *F21W 2102/13* (2018.01); *F21W 2102/135* (2018.01); *F21W 2102/14* (2018.01); *F21W 2102/145* (2018.01); *F21W 2102/15* (2018.01); *F21W 2102/155* (2018.01); *F21W 2102/16* (2018.01); *F21W 2102/165* (2018.01); *F21W 2102/17* (2018.01); *F21W 2102/18* (2018.01); *F21W 2102/19* (2018.01); *F21W 2102/20* (2018.01)

(58) Field of Classification Search
CPC .. B60Q 1/0041; B60Q 1/0047; B60Q 1/0058; F21W 2102/10; F21W 2102/20; F21W 2102/13; F21W 2102/135; F21W 2102/14; F21W 2102/145; F21W 2102/15; F21W 2102/155; F21W 2102/16; F21W 2102/165; F21W 2102/17; F21W 2102/18; F21W 2102/19
See application file for complete search history.

(56) References Cited

U.S. PATENT DOCUMENTS 3,062,951 A * 11/1962 Falge ..................... F21S 41/29
                                                     362/211
8,928,226 B1 * 1/2015 Harrington, Jr. ........ B60Q 1/20
                                                     315/192

(Continued)

*Primary Examiner* — Colin J Cattanach
(74) *Attorney, Agent, or Firm* — United One Law Group LLC; Kongsik Kim; Jhongwoo Peck

(57) ABSTRACT

A vehicle lamp includes a first lamp unit for forming a first region of a beam pattern, and a second lamp unit for forming a second region of the beam pattern. The first lamp unit and the second lamp unit are arranged in a left-right direction. Each of the first lamp unit and the second lamp unit includes a plurality of lamp modules arranged in the left-right direction, each of the plurality of lamp modules including a light source unit including a light source and a light path adjusting unit. A position of light irradiation region formed by the light emitted from each of the plurality of lamp modules is particularly configured depending on a position of the light source with respect to a rear focal point of the light path adjusting unit.

10 Claims, 21 Drawing Sheets

(51) Int. Cl.
    *F21W 102/20*     (2018.01)
    *F21W 102/165*     (2018.01)
    *F21W 102/155*     (2018.01)
    *F21W 102/18*     (2018.01)
    *F21W 102/19*     (2018.01)
    *F21W 102/135*     (2018.01)
    *F21W 102/145*     (2018.01)
    *F21W 102/15*     (2018.01)
    *F21W 102/14*     (2018.01)
    *F21W 102/16*     (2018.01)

(56) References Cited

U.S. PATENT DOCUMENTS

| | | | | |
|---|---|---|---|---|
| 2004/0196663 | A1* | 10/2004 | Ishida | F21S 41/148 |
| | | | | 362/539 |
| 2004/0223337 | A1* | 11/2004 | Ishida | F21S 41/155 |
| | | | | 257/E33.059 |
| 2005/0094413 | A1* | 5/2005 | Sazuka | F21S 41/148 |
| | | | | 362/544 |
| 2007/0201241 | A1* | 8/2007 | Komatsu | F21S 41/153 |
| | | | | 362/544 |
| 2013/0155710 | A1* | 6/2013 | Albou | B60Q 1/0041 |
| | | | | 362/235 |
| 2016/0109084 | A1* | 4/2016 | Potter | F21S 43/235 |
| | | | | 362/511 |
| 2016/0272106 | A1* | 9/2016 | Kato | F21S 41/148 |
| 2016/0334072 | A1* | 11/2016 | Meyrenaud | F21S 41/27 |
| 2017/0153000 | A1* | 6/2017 | Sato | F21S 41/147 |
| 2018/0187854 | A1* | 7/2018 | Sato | F21S 41/36 |
| 2018/0356060 | A1* | 12/2018 | Kasano | F21S 41/19 |
| 2022/0275923 | A1* | 9/2022 | Hayashi | F21S 41/151 |

* cited by examiner

FIG. 19

| LAMP MODULE | LIGHT SOURCE POSITION |
|---|---|
| FIRST LAMP MODULE | BF, 112 |
| SECOND LAMP MODULE | BF, 212 |
| THIRD LAMP MODULE | BF, 312 |

| LAMP MODULE | LIGHT SOURCE POSITION |
|---|---|
| FOURTH LAMP MODULE |  |
| FIFTH LAMP MODULE |  |
| SIXTH LAMP MODULE |  |

LAMP FOR VEHICLE

CROSS-REFERENCE TO RELATED APPLICATION

This application claims priority to Korean Patent Application No. 10-2020-0187862 filed on Dec. 30, 2020, which is incorporated herein by reference in its entirety.

BACKGROUND

1. Technical Field

The present disclosure relates to a vehicle lamp, and more particularly, to a vehicle lamp capable of forming an optimal beam pattern while preventing a decrease in visibility regardless of viewing directions around the vehicle.

2. Description of the Related Art

In general, a vehicle is provided with various types of lamps having an illumination function for easily identifying an object located around the vehicle during low-light conditions (e.g., night driving) and a signaling function for notifying other vehicles or road users of the driving state of the vehicle.

For example, head lamps and fog lamps are mainly for illumination functions, and turn signal lamps, tail lamps and brake lamps are mainly for signaling functions. The installation standards and specifications of each lamp are stipulated by law and regulations to ensure that the function of each lamp is fully implemented.

Recently, research has been actively conducted to make a vehicle lamp more compact and slim by using micro lenses having a relatively short focal length and capable of reducing the overall size. In some cases, the vehicle lamp is required to form a beam pattern with a plurality of light irradiation regions, such as the high illuminance region and the spread region of the low beam pattern. Conventionally, a plurality of lamps are required for forming the plurality of light irradiation regions.

When a plurality of vehicle lamps are provided, the brightness of the image formed by the light emitted from a specific lamp may be relatively darker when viewed around the vehicle depending on the position where the light irradiation region is formed by each lamp. Therefore, there is a possibility that an incomplete lamp image or a less-than-ideal lamp image may be formed as a whole.

Accordingly, there is a need for a method to prevent the formation of an incomplete lamp image by preventing the brightness of an image formed by a specific lamp from being relatively dimmed depending on viewing directions around the vehicle.

SUMMARY

The present disclosure provides a vehicle lamp capable of adjusting the position of the light irradiation region formed by each of the plurality of lamp modules so that the image formed by each of the plurality of lamp modules has substantially consistent brightness as a whole even if the viewing direction around the vehicle changes.

The problems that the present disclosure addresses are not limited to the problems mentioned above, and other problems not mentioned will be clearly understood by those skilled in the art from the following description.

According to an aspect of the present disclosure, a vehicle lamp may include a first lamp unit for forming a first region of a beam pattern; and a second lamp unit for forming a second region of the beam pattern. The first lamp unit and the second lamp unit may be arranged in a left-right direction. Each of the first lamp unit and the second lamp unit may include a plurality of lamp modules arranged in the left-right direction, and each of the plurality of lamp modules may include a light source unit including a light source for generating light; and a light path adjusting unit for adjusting a path of the light generated from the light source unit. In particular, a position of light irradiation region formed by the light emitted from each of the plurality of lamp modules may be configured depending on a position of the light source with respect to a rear focal point of the light path adjusting unit. For example, in the first lamp unit, a center of a light irradiation region formed by each of the plurality of lamp modules may be disposed either on the rear focal point of the light path adjusting unit or on any one of both sides with respect to the rear focal point of the light path adjusting unit in the left-right direction, and, in the second lamp unit, a center of a light irradiation region formed by at least one of the plurality of lamp modules and a center of a light irradiation region formed by at least one other of the plurality of lamp modules may be respectively disposed on both sides with respect to the rear focal point of the light path adjusting unit in the left-right direction.

Any one of the first lamp unit or the second lamp unit may form a high illuminance region of the beam pattern, and the other thereof may form a spread region that allows the high illuminance region to expand in at least one of a vertical direction or the left-right direction.

The first lamp unit may be disposed on an inward side of the vehicle compared to the second lamp unit along the left-right direction.

The first lamp unit may be disposed more forward compared to the second lamp unit.

In each of the first lamp unit and the second lamp unit, the plurality of lamp modules may be disposed gradually rearward as they go from an inward side of the vehicle to an outward side of the vehicle along the left-right direction.

In the first lamp unit, centers of the light sources of the lamp modules may be disposed either on an extension line passing through the rear focal point of the light path adjusting unit in a vertical direction or in an outward side of the vehicle among both sides of the extension line in the left-right direction.

In the second lamp unit, a center of a light source of at least one lamp module may be disposed in an inward side of the vehicle with respect to an extension line passing through the rear focal point of the light path adjusting unit in a vertical direction, and a center of a light source of at least one other lamp module may be disposed in an outward side of the vehicle with respect to the extension line.

In the plurality of lamp modules of each of the first lamp unit and the second lamp unit, the light sources may be disposed at or below the rear focal point of the light path adjusting unit.

A light source of a lamp module of any one of the first lamp unit or the second lamp unit may be disposed lower than a light source of another lamp module of the other of the first lamp unit or the second lamp unit.

The light sources of the plurality of lamp modules of the first lamp unit may be disposed lower than the light sources of the plurality of lamp modules of the second lamp unit.

Other specific details of the disclosure are included in the detailed description and drawings.

According to the vehicle lamp of the present disclosure as described above, one or more of the following advantages may be provided. The light distribution performance of the beam pattern can be satisfied, and the visibility can be maintained regardless of the viewing direction around the vehicle, by adjusting the position of the light source of each of the plurality of lamp modules, without adding a separate lamp module.

Effects of the present disclosure are not limited to the effects mentioned above, and other effects not mentioned will be clearly understood by those skilled in the art from the description of the claims.

BRIEF DESCRIPTION OF THE DRAWINGS

These and/or other aspects will become apparent and more readily appreciated from the following description of the exemplary embodiments, taken in conjunction with the accompanying drawings in which:

FIGS. 19 to 21 are schematic views showing a light source position of each of a plurality of lamp modules according to an exemplary embodiment of the present disclosure.

DETAILED DESCRIPTION

Figure 1:
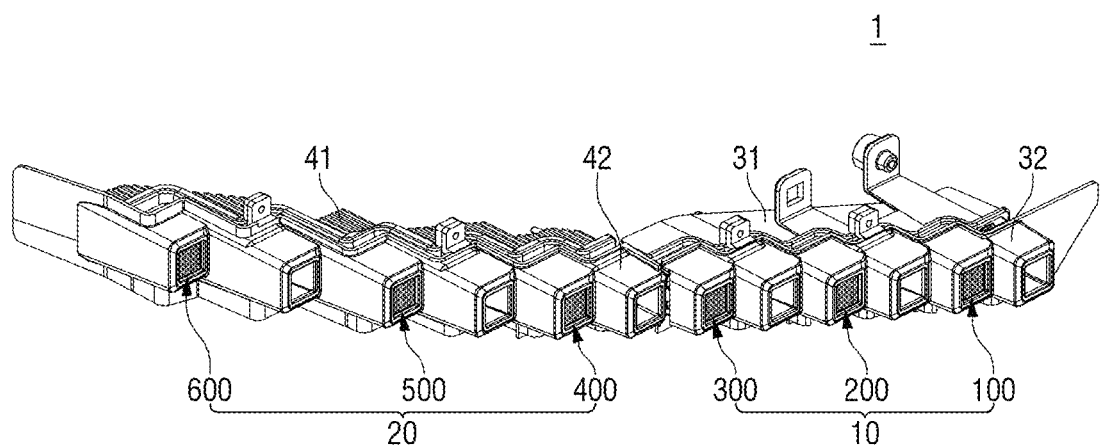
FIG. 1 is a perspective view showing a vehicle lamp according to an exemplary embodiment of the present disclosure.

Advantages and features of the present disclosure and methods of accomplishing the same may be understood more readily by reference to the following detailed description of preferred exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-sectional illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a vehicle lamp according to exemplary embodiments of the present disclosure.

Figure 2:
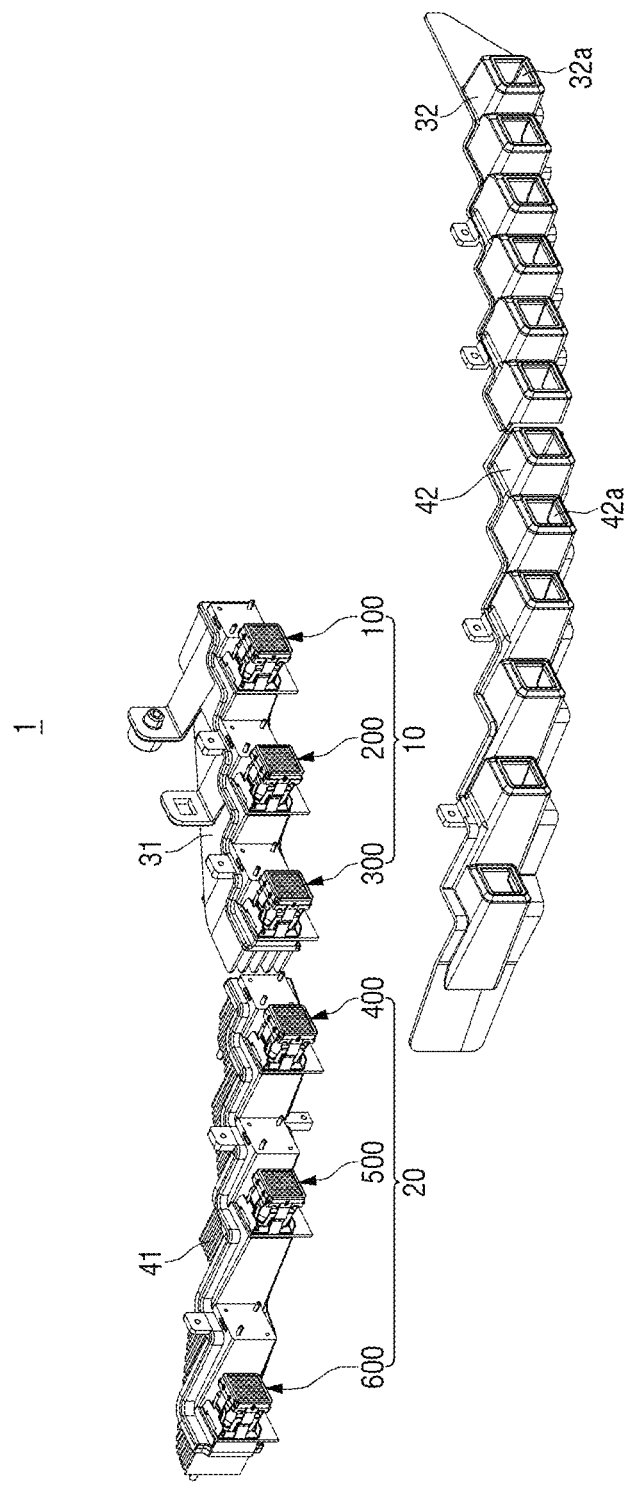
FIG. 2 is an exploded perspective view showing a vehicle lamp according to an exemplary embodiment of the present disclosure.
Figure 3:
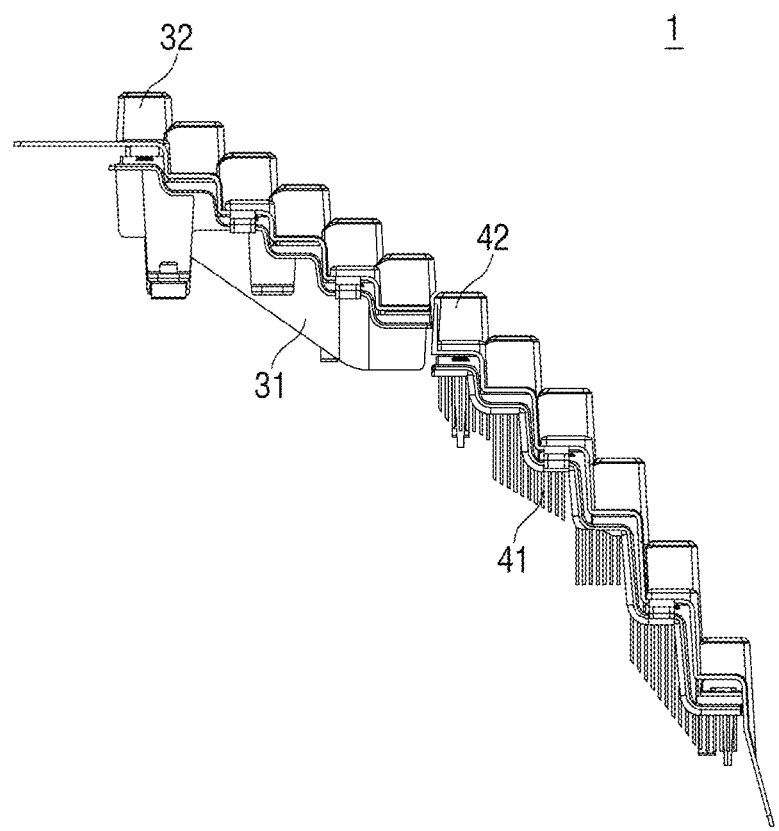
FIGS. 3 and 4 are plan views showing a vehicle lamp according to an exemplary embodiment of the present disclosure.
Figure 4:
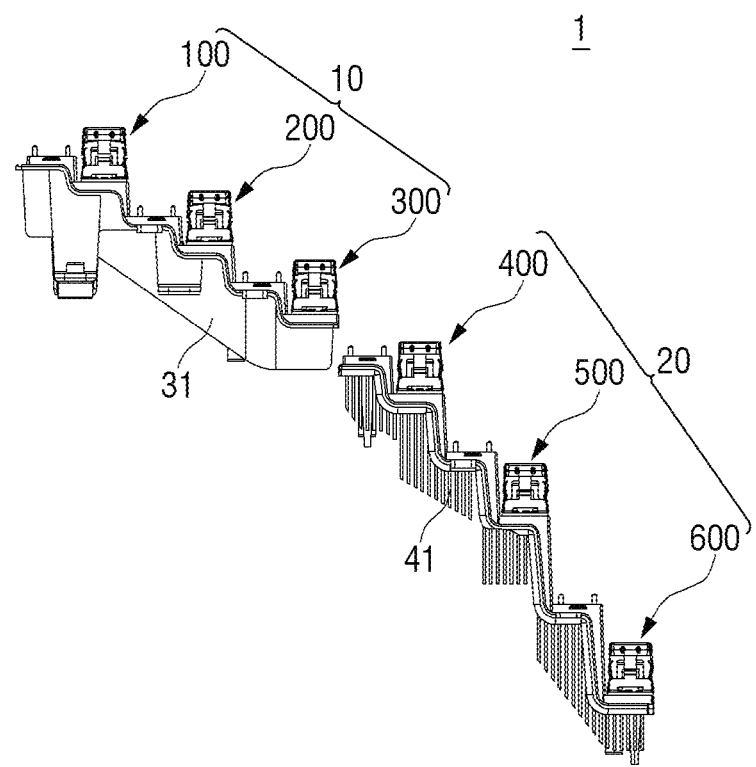

FIG. 1 is a perspective view showing a vehicle lamp according to an exemplary embodiment of the present disclosure, FIG. 2 is an exploded perspective view showing a vehicle lamp according to an exemplary embodiment of the present disclosure, FIGS. 3 and 4 are plan views showing a vehicle lamp according to an exemplary embodiment of the present disclosure, and FIG. 4 is an example, shown with the bezels 32 and 42 of FIG. 3 omitted for illustration purposes.

Referring to FIGS. 1 to 4, the vehicle lamp 1 according to the exemplary embodiment of the present disclosure may include a first lamp unit 10 and a second lamp unit 20 arranged in the left-right direction to form different regions of a beam pattern.

In the exemplary embodiment of the present disclosure, for example, the vehicle lamp 1 may be used as a head lamp installed on both sides of the front of the vehicle so that the driver's front view is secured by irradiating light in the driving direction of the vehicle when the vehicle is driving in low-light conditions (e.g., at night or in a tunnel). However, the present disclosure is not limited thereto, and the vehicle lamp 1 of the present disclosure may be used not only as a head lamp, but also as various lamps installed in a vehicle, such as a tail lamp, a brake lamp, a fog lamp, a position lamp, a turn signal lamp, a daytime running lamp (DRL), and a backup lamp.

Further, in the exemplary embodiment of the present disclosure, for example, the vehicle lamp 1 of the present disclosure may form a low beam pattern, in which light is irradiated on the lower side with respect to a predetermined cut-off line so as not to cause glare to the driver of a vehicle in front, such as a preceding vehicle or an oncoming vehicle. However, the present disclosure is not limited thereto, and the type of beam pattern to be formed may vary depending on the purpose of the vehicle lamp 1 of the present disclosure.

The first lamp unit 10 and the second lamp unit 20 may include different sets among a plurality of lamp modules 100, 200, 300, 400, 500 and 600 arranged in the left-right direction. In the exemplary embodiment of the present disclosure as described below, the plurality of lamp modules 100, 200, 300, 400, 500, and 600 are respectively referred as the first to sixth lamp modules 100, 200, 300, 400, 500 and 600 going from inward of the vehicle to outward along the left-right direction. Note that the vehicle lamp 1 of the present disclosure shown in FIG. 1 depicts an example implemented as a right (i.e., passenger side) head lamp.

Further, the first lamp module 100 to the sixth lamp module 600 may be arranged gradually rearward as they go from the first lamp module 100 to the sixth lamp module 600. Similarly, in a left head lamp, a plurality of lamp modules may be arranged gradually rearward as they go from inward of the vehicle to outward along the left-right direction.

The configuration that the first to sixth lamp modules 100, 200, 300, 400, 500, and 600 are disposed rearward as they go from the first lamp module 100 to the sixth lamp module 600 may be to conform the contour of the body line of the vehicle. For example, the contour of the outer surface of the cover lens (not shown) of the head lamp for irradiating light to the outside of the vehicle may be inclined or curved in the left-right direction rather than having a planar contour facing the front of the vehicle. Depending on the shape of the body contour of the vehicle, the positions of the first to sixth lamp modules 100, 200, 300, 400, 500, and 600 may be accordingly arranged.

The first lamp unit 10 may be disposed on the inward side closer to the center of the vehicle in the left-right direction compared to the second lamp unit 20. The first lamp unit 10 may form a first region of the beam pattern, and the second lamp unit 20 may form a second region of the beam pattern.

In the exemplary embodiment of the present disclosure, since an example where the beam pattern formed by the vehicle lamp 1 is a low beam pattern is described, the first lamp unit 10 may form a spread region of the low beam pattern, and the second lamp unit 20 may form a high illuminance region of the low beam pattern. However, the present disclosure is not limited thereto, and the first region and the second region may be responsible for different functions according to the beam pattern to be formed by the vehicle lamp 1 of the present disclosure.

Figure 5:
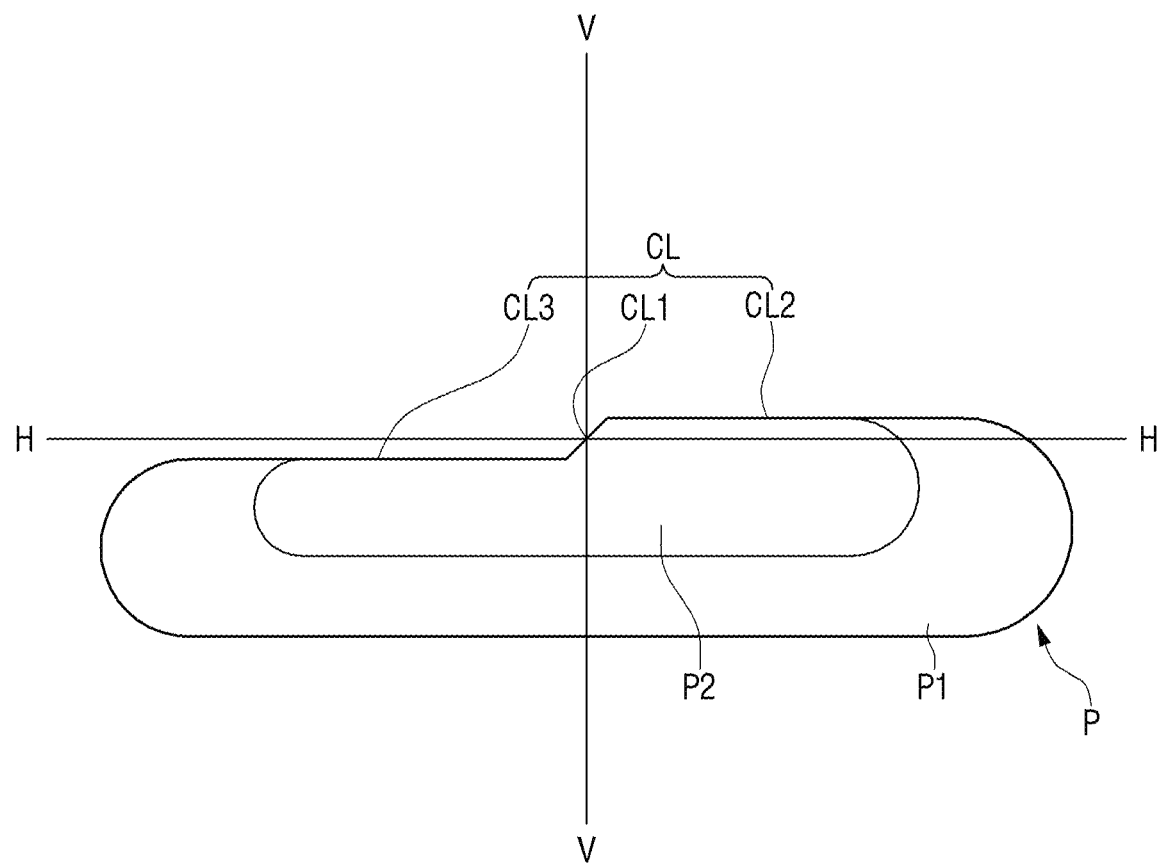
FIG. 5 is a schematic view showing a beam pattern formed by a vehicle lamp according to an exemplary embodiment of the present disclosure.

FIG. 5 is a schematic diagram illustrating a beam pattern formed by a vehicle lamp according to an exemplary embodiment of the present disclosure. Referring to FIG. 5, the vehicle lamp 1 according to the exemplary embodiment of the present disclosure may form a low beam pattern LP, in which light is irradiated on the lower side with respect to a predetermined cut-off line CL. The first lamp unit 10 may form the spread region P1 of the low beam pattern LP, and the second lamp unit 20 may form the high illuminance region P2 of the low beam pattern LP.

In particular, the high illuminance region P2, which is configured for securing a sufficient viewing distance in front of the vehicle, may exhibit a relatively higher brightness compared to the spread region P1, which is primarily configured to secure a wider near-field view by expanding the region where light is irradiated in at least one direction of the vertical direction or the left-right direction with respect to the high illuminance region P2. FIG. 5 shows an example where the spread region P1 expands a region where the light is irradiated respectively in the vertical direction and the left-right directions with respect to the high illuminance region P2, but the present disclosure is not limited thereto, and the spread region P1 may expand a region where the light is irradiated in any one of the vertical direction or the left-right directions with respect to the high illuminance region P2.

The positions of the first lamp unit 10 and the second lamp unit 20 and the regions formed by the first lamp unit 10 and the second lamp unit 20 are not limited to the above-described example, however. Any one of the first lamp unit 10 or the second lamp unit 20 may be disposed at the inward side of the vehicle compared to the other, and any one of the first lamp unit 10 or the second lamp unit 20 may form a spread region and the other may form a high illuminance region.

In the exemplary embodiment of the present disclosure, a case in which six lamp modules 100, 200, 300, 400, 500, and 600 are provided, and each of the first lamp unit 10 and the second lamp unit 20 includes three lamp modules will be described as an example. However, this configuration is merely an example to help the understanding of the present disclosure, and the present disclosure is not limited thereto. The number of the plurality of lamp modules 100, 200, 300, 400, 500, and 600 and/or the number of lamp modules included in each of the first lamp unit 10 and the second lamp unit 20 may vary depending on the beam pattern to be formed by the vehicle lamp 1 of the present disclosure. Each of the first lamp unit 10 and the second lamp unit 20 may include two or more lamp modules so that light distribution performance, for example, a light irradiation angle in the left-right direction, can be satisfied.

Referring to FIGS. 1 to 4, in the first lamp unit 10, first to third lamp modules 100, 200, and 300 may be mounted on a front surface of a first heat dissipation unit 31, and the light generated from at least one of the first to third lamp modules 100, 200, and 300 may be guided forward through at least one of a plurality of guide holes 32a formed in a first bezel 32 disposed in front of the first heat dissipation unit 31 to form a beam pattern suitable for the purpose of the vehicle lamp 1 of the present disclosure.

The first heat dissipation unit 31 may include a space in which the first to third lamp modules 100, 200, and 300 are mounted. Further, in at least one side of the first to third lamp modules 100, 200, and 300, the first heat dissipation unit 31 may also include a space in which a lamp module may be added for forming a beam pattern for a purpose different from the first to third lamp modules 100, 200, and 300, for example, a beam pattern suitable for a daytime running lamp, a turn signal lamp, a position lamp, or the like.

In addition, in the second lamp unit 20, fourth to sixth lamp modules 400, 500, and 600 may be mounted on the front surface of a second heat dissipation unit 41, and the light generated from at least one of the fourth to sixth lamp modules 400, 500, and 600 may be guided forward through at least one of a plurality of guide holes 42a formed in a second bezel 42 disposed in front of the second heat dissipation unit 41 to form a beam pattern suitable for the purpose of the vehicle lamp 1 of the present disclosure.

The second heat dissipation unit 41, similarly to the above-described first heat dissipation unit 31, may include a space in which the fourth to sixth lamp modules 400, 500, and 600 are mounted. Further, in at least one side of the fourth to sixth lamp modules 400, 500, and 600, the second heat dissipation unit 41 may also include a space in which a lamp module may be added for forming a beam pattern for a purpose different from the fourth to six lamp modules 400, 500, and 600, for example, a beam pattern suitable for a daytime running lamp, a turn signal lamp, a position lamp, or the like.

In the exemplary embodiment of the present disclosure, an example where the heat dissipation units 31 and 41 and the bezels 32 and 42 for the first lamp unit 10 and the second lamp unit 20 are respectively provided is described. However, the present disclosure is not limited thereto, and the first heat dissipation unit 31, the second heat dissipation unit 41, the first bezel 32, and the second bezel 42 may be integrally formed.

Figure 6:
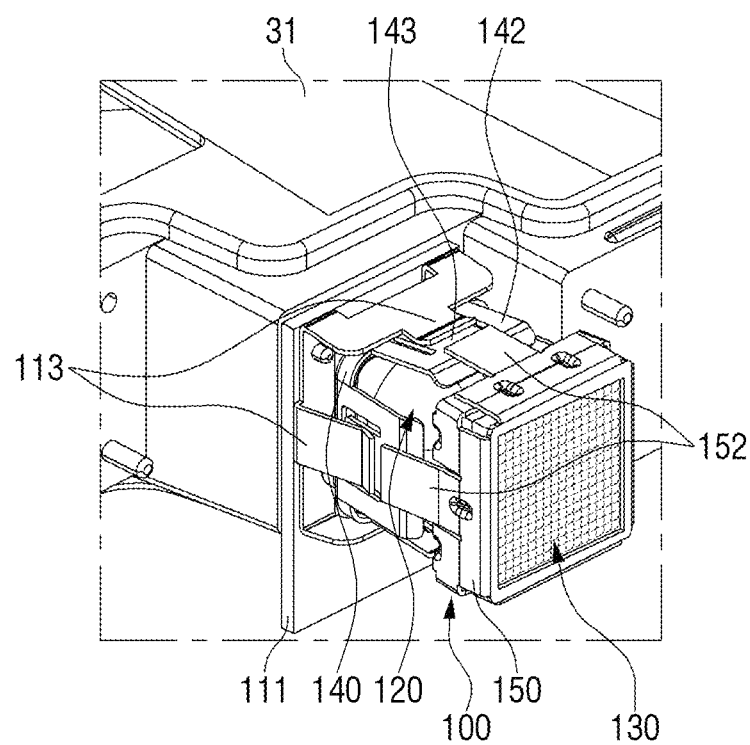
FIG. 6 is a perspective view showing a lamp module according to an exemplary embodiment of the present disclosure.
Figure 7:
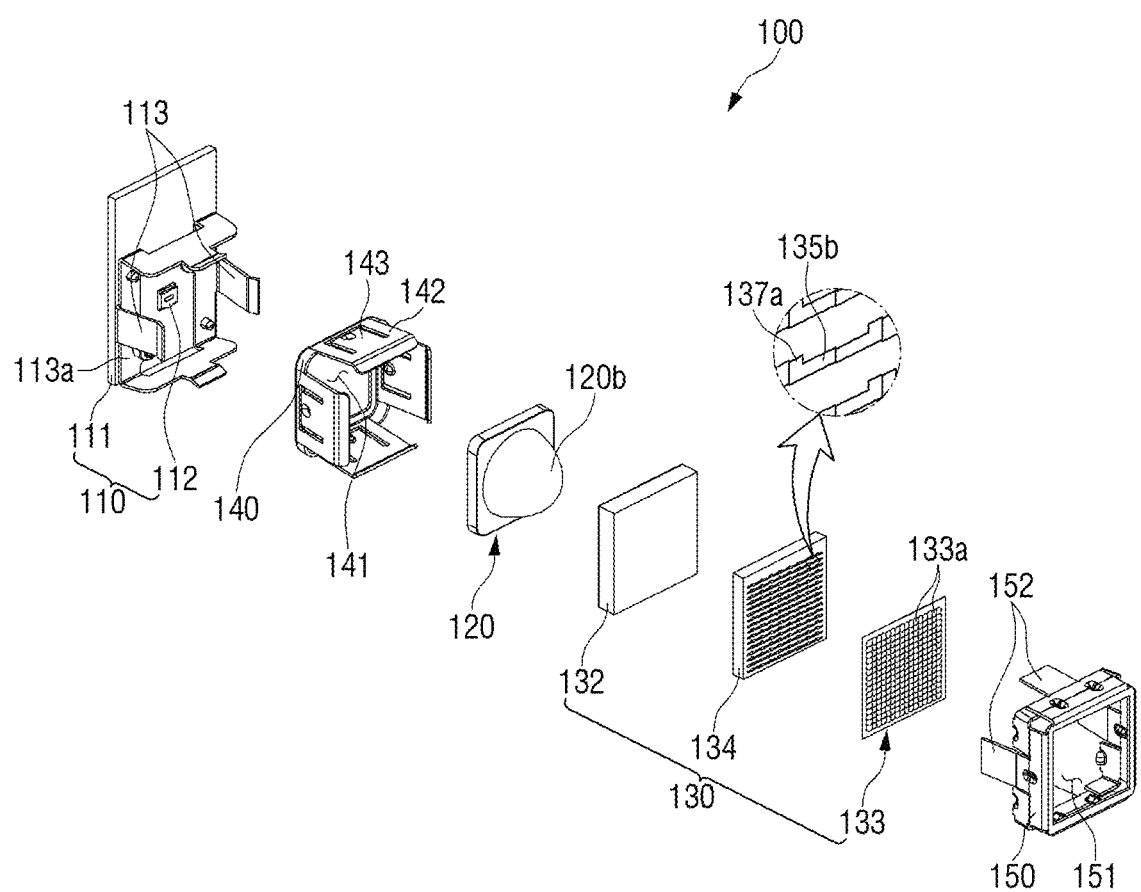
FIGS. 7 and 8 are exploded perspective views showing a lamp module according to an exemplary embodiment of the present disclosure.
Figure 8:
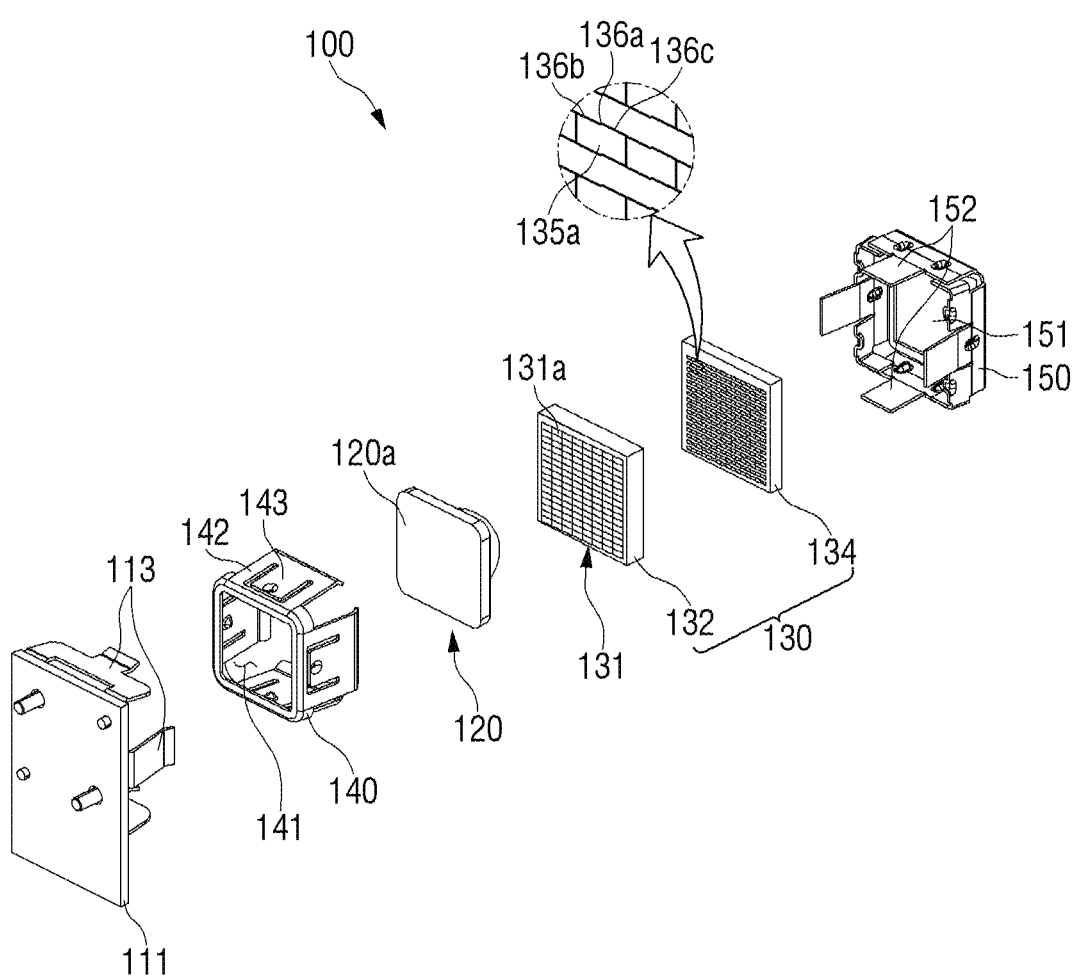
Figure 9:
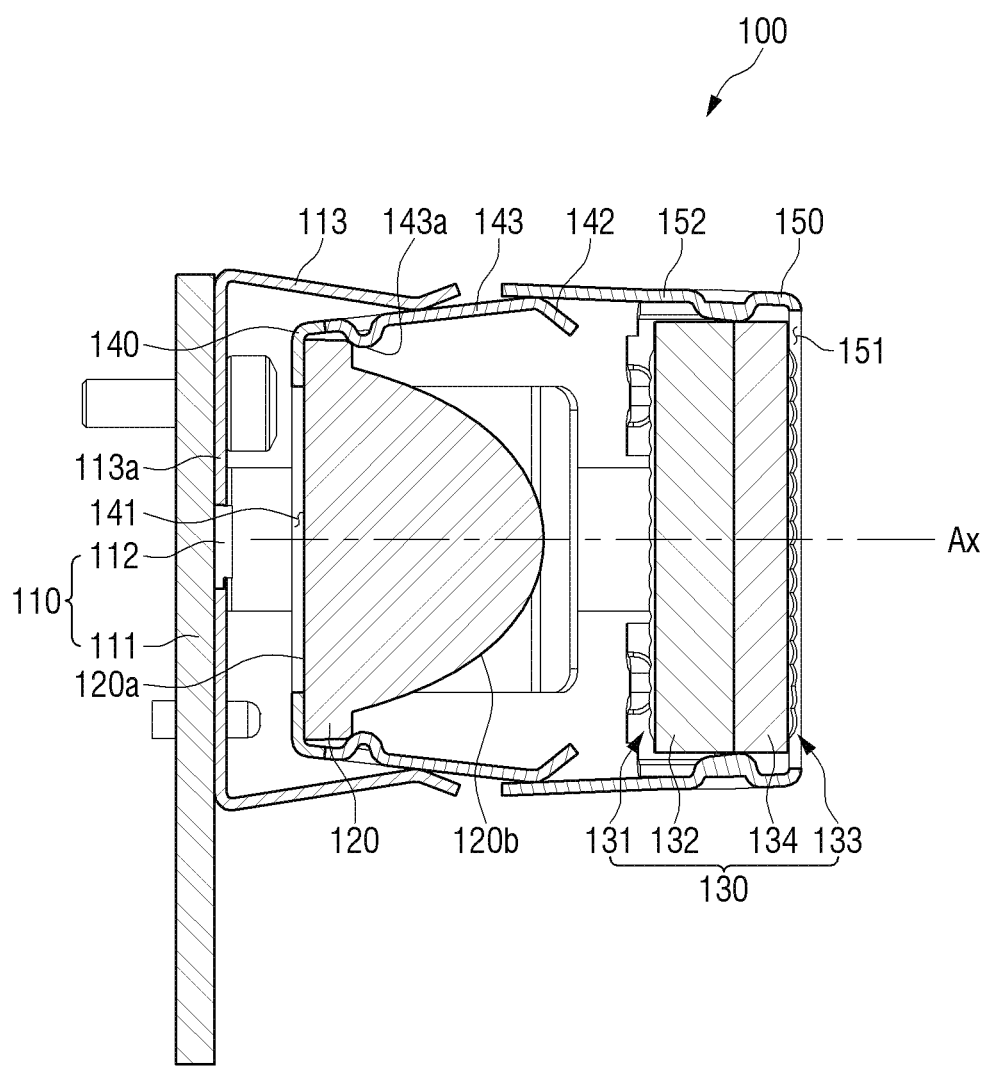
FIG. 9 is a cross-sectional view showing a lamp module according to an exemplary embodiment of the present disclosure.

FIG. 6 is a perspective view showing a lamp module according to an exemplary embodiment of the present disclosure, FIGS. 7 and 8 are exploded perspective views showing a lamp module according to an exemplary embodiment of the present disclosure, and FIG. 9 is a cross-sectional view showing the lamp module according to an exemplary embodiment of the present disclosure. For illustration purposes, FIGS. 7 to 9 are shown without the heat dissipation unit 31 of FIG. 6. FIGS. 6 to 9 depict the first lamp module 100, among the first to sixth lamp modules 100, 200, 300, 400, 500 and 600, to described the features of the present disclosure.

However, the remaining lamp modules 200, 300, 400, 500, and 600 may be configured identically or similarly with some differences in the positions of some components.

Referring to FIGS. 6 to 9, the first lamp module 100 according to an exemplary embodiment of the present disclosure may include a light source unit 110, a light path adjusting unit 120, and a lens unit 130. The light source unit 110 may include a substrate 111 and a light source 112 installed on the substrate 111. Various components for controlling the light source 112 or supplying power to the light source 112 may be installed on the substrate 111 together with the light source 112. The first heat dissipation unit 31 for facilitating heat dissipation may be mounted in order to prevent deterioration of light emitting performance due to the heat generated as the light is generated from the light source 112.

The light source 112 may include at least one light emitting device, and in the exemplary embodiment of the present disclosure, a case in which a semiconductor light emitting device such as a light emitting diode (LED) is used as the light emitting device will be described as an example.

The light source unit 110 may include a plurality of fixing units 113 formed such that one end extends forward from the other end close to the substrate 111, and the plurality of fixing units 113 disposed to face one another at both ends of the substrate 111 so that when assembling the light path adjusting unit 120 to be described later below, it can apply a force to both sides of the light path adjusting unit 120 to fix the position thereof.

In the exemplary embodiment of the present disclosure, the plurality of fixing units 113 in which one end connected to one side of the fixing bracket 113a coupled to the substrate 111 is formed by bending forward is described as an example. However, the present disclosure is not limited thereto, and one end of the plurality of fixing units 113 may be directly coupled to the substrate 111.

Each of the plurality of fixing units 113 may be formed such that a point somewhere between both ends may be disposed closer to the optical axis Ax of the light source 112 than one end, and when assembling the light path adjusting unit 120 to be described later below, the plurality of fixing units 113 may receive a force in a direction away from the optical axis Ax of the light source 112 with respect to one end, and accordingly, the position of the light path adjusting unit 120 can be fixed by the restoring force generated from the plurality of fixing units 113.

Herein, the optical axis Ax of the light source 112 may be understood as a line passing in the front-rear direction through the center of a region where light is generated from at least one light emitting device included in the light source 112.

The position of the light path adjusting unit 120 may be fixed by the support bracket 140, in which the light transmitting opening 141 is formed so that the light generated from the light source 112 is incident on the light path adjusting unit 120. The support bracket 140 may include a plurality of support units 142 formed to extend forward from the edge of the light transmitting opening 141, and each of the plurality of support units 142 may include a support rib 143 for fixing the light path adjusting unit 120 by receiving a force in a direction toward the optical axis Ax of the light source 112 by each of the plurality of fixing units 113.

The support rib 143 may include one end connected to the support unit 142, and the other portion may be formed to be separated from the support unit 142, and the position of the light path adjusting unit 120 may be fixed by the support rib 143 being elastically deformed with respect to one end of the support rib 143 connected to the support unit 142 when receiving a force by the plurality of fixing units 113. The support rib 143 may include a protrusion portion 143a that protrudes toward the light path adjusting unit 120 on the surface facing the light path adjusting unit 120, and the protrusion portion 143a may be disposed in front of the outer edge of the light path adjusting unit 120 so that the rear surface thereof may be in contact with the edge of the light transmitting opening 141, thereby fixing the position of the light path adjusting unit 120.

The light path adjusting unit 120 may adjust the path of the light so that the light generated from the light source 112 may proceed substantially parallel to the optical axis Ax of the light source 112, to allow the light to be substantially uniformly incident on the lens unit 130 to be described later below.

In the exemplary embodiment of the present disclosure, the light path adjusting unit 120 may be implemented as, for example, an aspherical lens. In the aspherical lens, an incident surface 120a, on which the light is incident, may include a planar shape; and an emitting surface 120b, through which the light is emitted, may include an aspherical shape. However, the present disclosure is not limited thereto, and the light path adjusting unit 120 may use not only an aspherical lens, but also various types of lenses, such as a Fresnel lens or a total internal reflector (TIR) lens, for adjusting the path of the light so that the light generated from the light source 112 may have a predetermined light irradiation angle with respect to the optical axis Ax and may proceed approximately parallel to the optical axis Ax.

The lens unit 130 may emit light incident from the light path adjusting unit 120 to form a beam pattern suitable for the purpose of the vehicle lamp 1 of the present disclosure. The position of the lens unit 130 may be fixed by a lens holder 150, in which an opened portion 151 is formed so that the light incident from the light path adjusting unit 120 may be emitted.

The lens holder 150 may include a plurality of fixing ribs 152 that extend rearwardly from the edge of the opened portion 151, and the lens holder 150 may be coupled to the support bracket 140 to fix the position of the lens unit 130.

The lens unit 130 may be fitted between fixing ribs formed to face one another among a plurality of fixing ribs 152 to be fixed in position, and each of the plurality of fixing ribs 152 may apply a force to each of the plurality of support units 142 in a direction toward the optical axis Ax of the light source 112, and accordingly, a restoring force may be generated from each of the plurality of support units 142, so that the support bracket 140 and the lens holder 150 may be fixed in position relative to each other. As such, the plurality of support units 142 may be formed so that one end close to the lens unit 130 diverges away from the optical axis Ax of the light source 112 compared to the other end connected to the edge of the light transmitting opening 141, and when one end of the plurality of support units 142 receives a force toward the optical axis Ax of the light source 112 by the plurality of fixing ribs 152, the position of the lens unit 130 can be fixed by the restoring force from the plurality of support units 142.

The lens unit 130 may include an incident lens unit 131, a first optical unit 132, an emitting lens unit 133, a second optical unit 134, and a shield unit 135. The incident lens unit 131 may include a plurality of incident lenses 131a that form rows extending in the left-right direction, and are arranged such that the rows in the left-right direction are arranged in the vertical direction. The plurality of incident lenses 131a may be formed to have a convex shape toward the light path adjusting unit 120. In the exemplary embodiment of the present disclosure, a case in which a micro lens having a relatively short focal length is used as the plurality of incident lenses 131a to reduce the overall size of the vehicle lamp 1 of the present disclosure will be described as an example.

The incident lens unit 131 may be formed on an incident surface, on which light is incident from the light path adjusting unit 120, of the first optical unit 132. The first optical unit 132 may be made of a material through which light is transmittable, such as glass. In the exemplary embodiment of the present disclosure, a case in which the incident lens unit 131 is integrally formed with the first optical unit 132 by surface processing thereof will be described as an example. However, the present disclosure is not limited thereto, and the incident lens unit 131 may be formed in the form of a film and be subsequently attached to the first optical unit 132.

Figure 10:
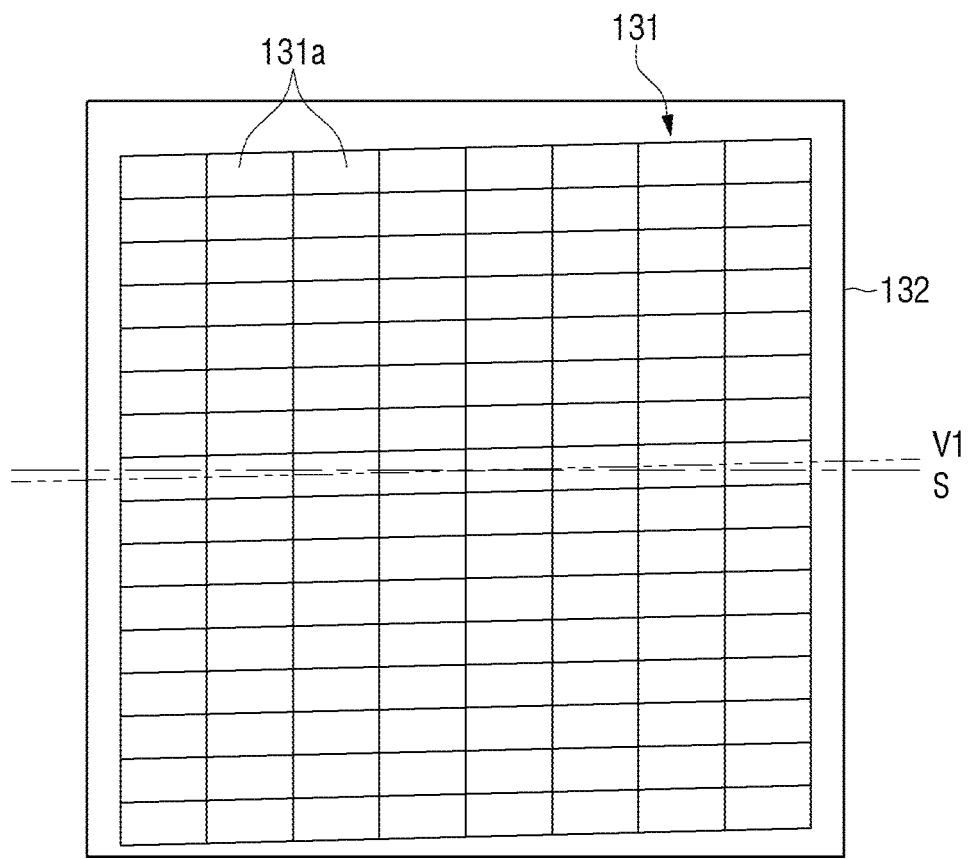
FIG. 10 is a schematic view showing an incident lens unit according to an exemplary embodiment of the present disclosure.

The plurality of incident lenses 311 may be arranged so that a row in the left-right direction is inclined at a predetermined angle. In other words, it may be understood that an imaginary line V1 connecting a specific point (e.g., a center) of each incident lens arranged to form the row in the left-right direction as shown in FIG. 10 may be arranged to be inclined to have a predetermined angle with respect to the horizontal line S.

The emitting lens unit 133 may include a plurality of emitting lenses 133a that form rows that extend in the left-right direction, and are arranged such that the rows in the left-right direction are arranged in the vertical direction. The plurality of emitting lenses 133a may be formed to have a convex shape toward the front. In the exemplary embodiment of the present disclosure, a case in which micro lenses having a relatively short focal length so as to reduce the overall size of the vehicle lamp 1 of the present disclosure are used as the plurality of emitting lenses 133a will be described as an example.

The emitting lens unit 133 may be formed on an emitting surface, through which light is emitted forward, of the second optical unit 134. The second optical unit 134 may be made of a material through which light is transmittable, such as glass. In the exemplary embodiment of the present disclosure, a case in which the emitting lens unit 133 is integrally formed with the second optical unit 134 by surface processing thereof will be described as an example. However, the present disclosure is not limited thereto, and the emitting lens unit 133 may be formed in the form of a film and be subsequently attached to the second optical unit 134.

Figure 11:
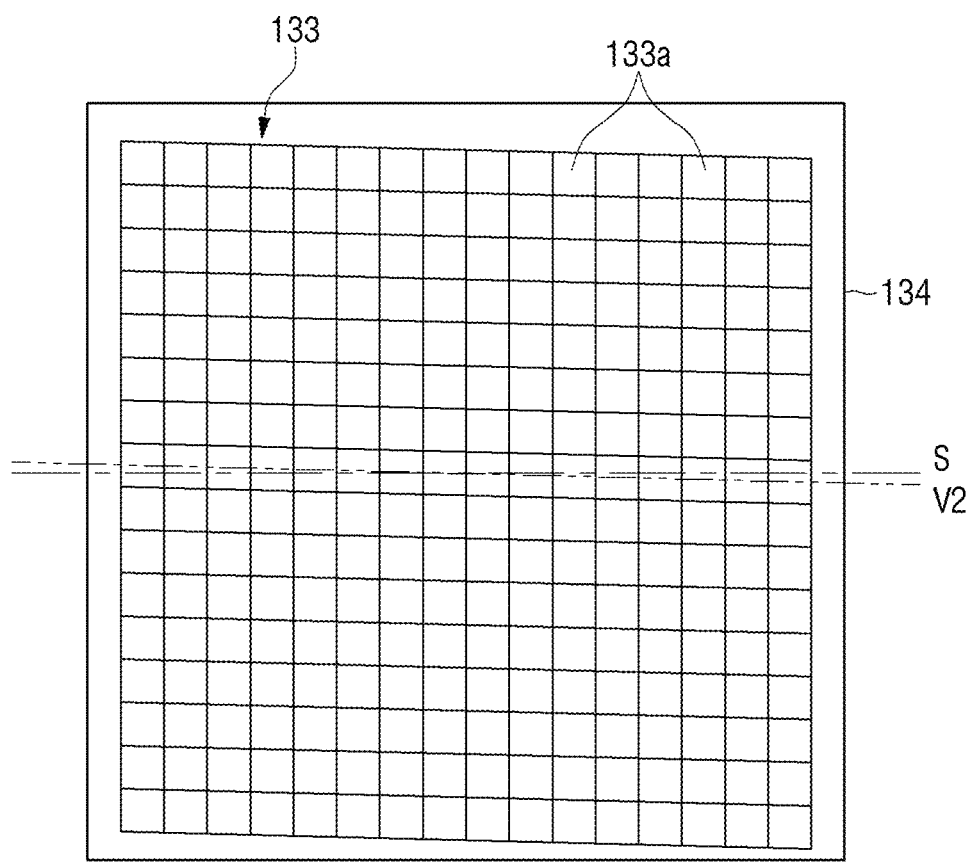
FIG. 11 is a schematic view showing an emitting lens unit according to an exemplary embodiment of the present disclosure.

Further, similar to the plurality of incident lenses 131a, the plurality of emitting lenses 133a may be arranged so that the rows in the left-right direction are inclined at a predetermined angle. It may be understood that an imaginary line V2 connecting a specific point (e.g., a center) of each of the emitting lenses that are arranged to form a row in the left-right direction as shown in FIG. 11 maybe arranged to be inclined to have a predetermined angle with respect to the horizontal line S.

In the exemplary embodiment of the present disclosure, each of the plurality of incident lenses 131a may be implemented as a lens having a semi-cylindrical shape that extends in the left-right direction, and the light emitted from each of the plurality of incident lenses 131a is incident on a plurality of emitting lenses arranged in the extension direction of the plurality of incident lenses 131a. For example, light emitted from each of the plurality of incident lenses 131a may be incident on two or more emitting lenses arranged among the plurality of emitting lenses 133a.

The number of emitting lenses, on which the light emitted from each of the plurality of incidence lenses 131a is incident, is not limited to the above-described example, however. Depending on the shape of the plurality of incidence lenses 131a and the plurality of emitting lenses 133a, it may correspond to one-to-one, one-to-many, many-to-one, many-to-many, etc.

Examples of the plurality of incident lenses 131a and the plurality of emitting lenses 133a corresponding one-to-many, many-to-one, or many-to-many can be found in U.S. Patent Application Publication No. 2019/0186706, which is incorporated herein by reference in its entirety.

Accordingly, the light emitted from each of the plurality of incident lenses 131a may be incident on two or more of the plurality of emitting lenses 131a, whereby the spread characteristics of the beam pattern formed by the vehicle lamp 1 of the present disclosure may be improved.

FIG. 10 shows that the plurality of incident lenses 131a may be arranged so that the rows in the left-right directions are inclined at a predetermined angle when the incident lens unit 131 is viewed from the rear of the lens unit 130. FIG.

11 shows that the plurality of emitting lenses 133a may be arranged so that the rows in the left-right direction are inclined at a predetermined angle when the emitting lens unit 133 is viewed from the front of the lens unit 130. It may be understood that the plurality of incident lenses 131a and the plurality of emitting lenses 133a may be arranged such that the rows in the left-right direction are formed to be inclined in the same direction with respect to the horizontal line S.

Meanwhile, the second optical unit 134 may be disposed in front of the first optical unit 132, and may be disposed so that surfaces facing each other are in contact with each other. However, the present disclosure is not limited thereto, and the first optical unit 132 and the second optical units 134 may be spaced apart from each other by a predetermined interval for purposes of light diffusion and the like.

The shield unit 135 may be disposed between the incident lens unit 131 and the emitting lens unit 133 to block at least a portion of the light emitted to the plurality of emitting lenses 133a, thereby allowing a cut-off line of a beam pattern to be formed.

The shield unit 135 may include a plurality of first shields 135a and a plurality of second shields 135b respectively formed on an incident surface and an emitting surface of any one of the first optical unit 132 or the second optical unit 134. In an exemplary embodiment of the present disclosure, a case in which the plurality of first shields 135a are formed on the incident surface of the second optical unit 134, that is, the surface facing the first optical unit 132, and the plurality of the second shields 135b are formed on the emitting surface of the second optical unit 134, that is, the front-facing surface, will be described as an example.

An upper center of each of the plurality of first shields 135a may be disposed at the focal points of the corresponding incident lens and the emitting lens among the plurality of incident lenses 131a and the plurality of emitting lenses 133a, so that it may block a portion of the light incident to each of the plurality of emitting lenses 133a to form the above-described cut-off line CL of FIG. 5.

At the upper end (e.g., top line) of each of the plurality of first shields 135a, as shown in FIG. 5, the inclined edge portion 136a forming the inclined line CL1, the first edge portion 136b forming the upper line CL2, and the second edge portion 136c forming the lower line CL3 may be formed.

Herein, the positions of the first edge portion 136b and the second edge portion 136c, and the positions of the upper line CL2 and the lower line CL3 appears reversed (e.g., inverted) since the light incident to the plurality of emitting lenses 133a is emitted in an inverse image when an aspherical lens is used as the plurality of emitting lenses 133a.

Figure 12:
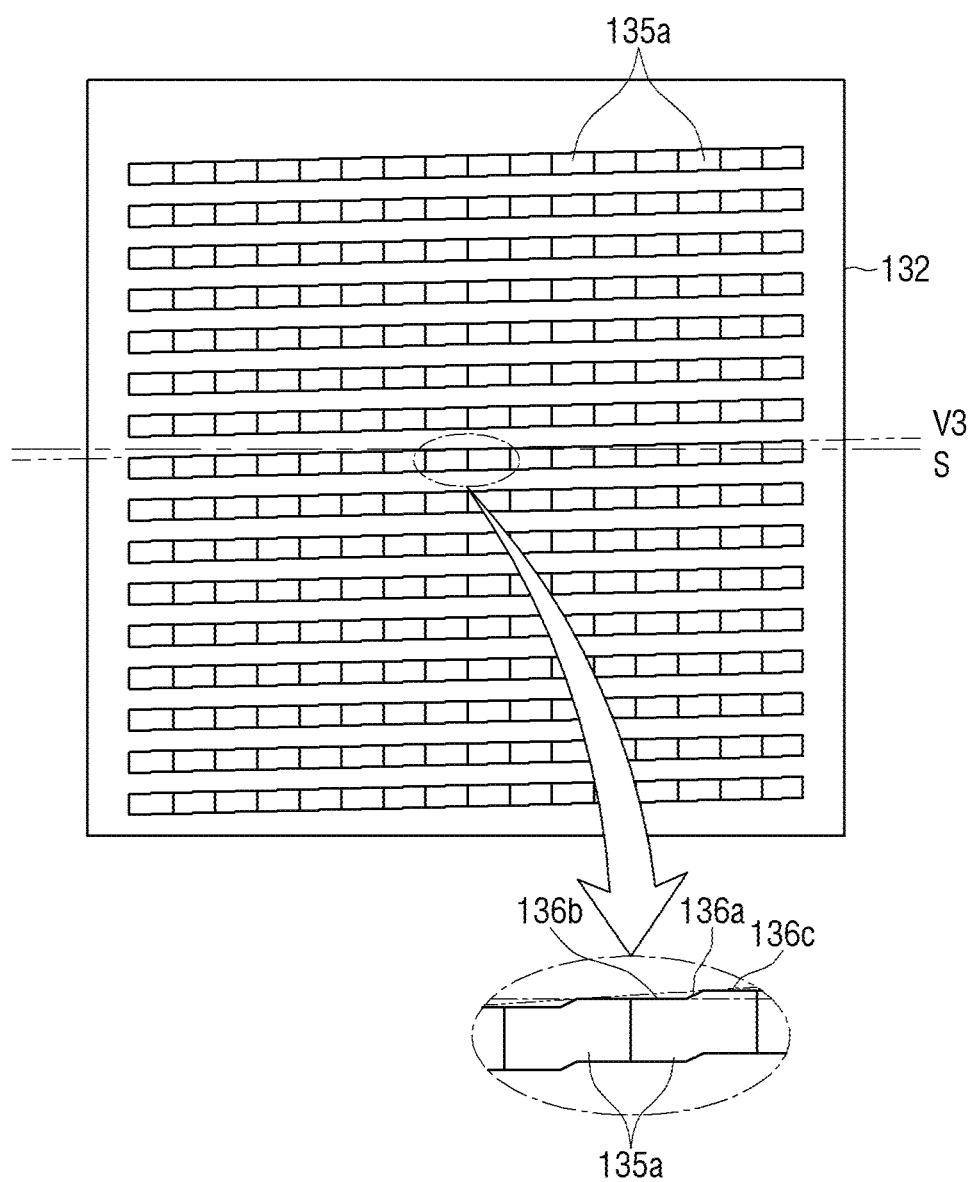
FIG. 12 is a schematic diagram illustrating a plurality of first shields according to an exemplary embodiment of the present disclosure.

The plurality of first shields 135a may be arranged such that the rows that extend in the left-right direction may be arranged in the vertical direction, and as shown in FIG. 12, the rows in the left-right direction may be arranged to be inclined at a predetermined angle.

FIG. 12 shows an example where the plurality of first shields 135a are viewed from the rear of the second optical unit 134, and the configuration that the plurality of first shields 135a are arranged so that the rows in the left-right direction are inclined at a predetermined angle may be understood that an imaginary line V3 connecting a specific point (e.g., the upper end of the inclined edge portion 136a) of each of the plurality of first shields 135a may be arranged to have a predetermined angle with the horizontal line S.

Due to the configuration that the plurality of first shields 135a are arranged so that the rows in the left-right direction are inclined at a predetermined angle, the first edge portion 136b of any one of the plurality of first shields 135a may have the same height (e.g., vertical position) as the second edge portion 136c of an adjacent first shield 135a (e.g., the left shield shown in the inset of FIG. 12), and the second edge portion 136c of the any one of the plurality of first shields 135a may be aligned with the first edge portion 136b of the other adjacent shield (e.g., the right shield).

In other words, since when the plurality of first shields 135a are arranged horizontally in the left-right direction, a step difference may occur between the first and second edge portions of adjacent first shields 135a, this step difference may cause a portion lower than the upper line CL2 and a portion higher than the lower line CL3 to be formed on both sides of the cut-off line CL. In this case, not only the driver may feel a sense of discomfort, but also the driver's field of view may be restricted or glare may occur to the driver of the vehicle in front.

Accordingly, in the exemplary embodiment of the present disclosure, the plurality of first shields 135a may be arranged so that the rows in the left-right direction are inclined at a predetermined angle, thereby preventing a step difference between the adjacent first shields.

When the plurality of first shields 135a are arranged so that the rows in the left-right direction are inclined at a predetermined angle, the position of the focal point may be required to be changed compared to the case where the plurality of first shields 135a are horizontally arranged, and thus, the plurality of incident lenses 131a and the plurality of emitting lenses 133a may also be arranged to make the rows in the left-right direction to be inclined at a predetermined angle consistent with the plurality of first shields 135a as described above.

In the exemplary embodiment of the present disclosure, a case in which the rows of the plurality of first shields 135a are inclined upward in the direction from the first edge portion 136b to the second edge portion 136c is described as an example. As the first edge portion 136b forms the line CL2 corresponding to the driving lane of the cut-off line CL, and the second edge portion 136c forms the line CL3 corresponding to the opposite lane of the cut-off line CL, it may be understood that the plurality of first shields 135a are arranged so that the rows in the left-right direction are inclined upward in a direction from the opposite lane toward the driving lane.

Further, a plurality of second shields 135b may horizontally form the upper line CL2 and the lower line CL3 of the cut-off line CL. Since the upper line CL2 and the lower line CL3 of the cut-off line CL are mainly formed by light emitted from the lower portion of the plurality of emitting lenses 133a, the upper line CL2 and the lower line CL3 of the cut-off line CL can be formed horizontally compared to the case, in which the plurality of second shields 135b are omitted.

Figure 13:
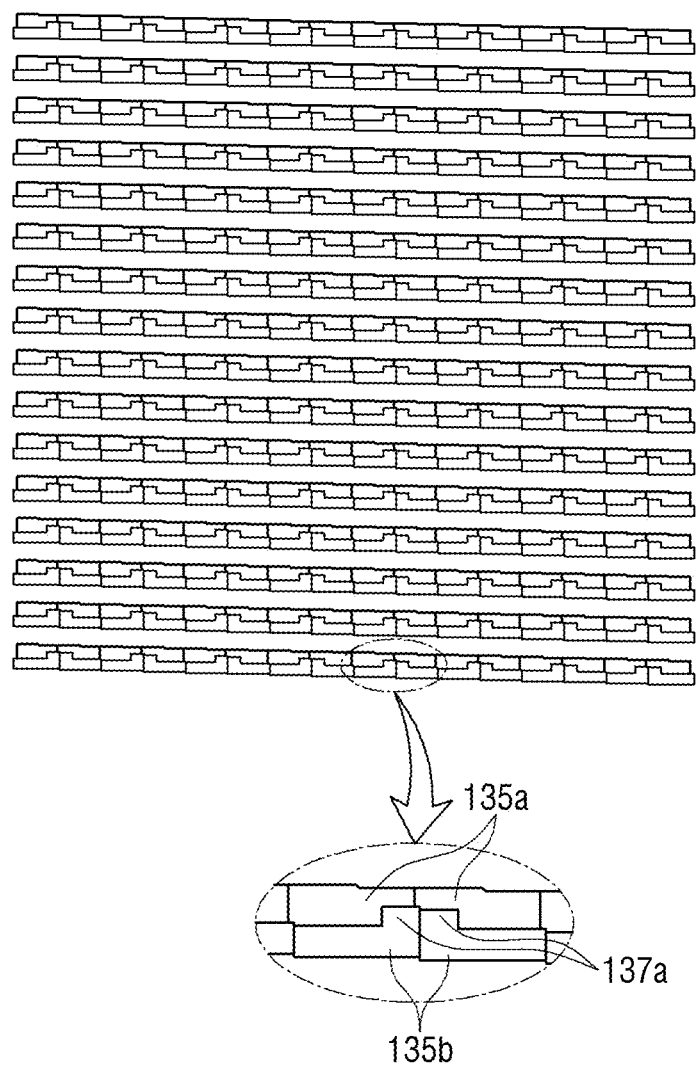
FIG. 13 is a schematic diagram illustrating a plurality of second shields according to an exemplary embodiment of the present disclosure.

In an exemplary embodiment of the present disclosure, the upper end of each of the plurality of second shields 135b may be disposed below the upper end of the corresponding first shield among the plurality of first shields 135a as shown in FIG. 13. This configuration may increase the light efficiency because when each of the plurality of second shields 135b has the upper end disposed at the same height or higher compared to the upper end of the plurality of first shields 135a, where the upper center is disposed at or near the rear focal point F of each of the plurality of emitting lenses 133a, the amount of light that is blocked may increase and the light efficiency may decrease.

In addition, the plurality of second shields 135b may be arranged so that the rows in the left-right direction are inclined upward in a direction from the first edge portion 136b of the first shield 135a toward the second edge portion 136c, like the plurality of incident lenses 131a, the plurality of emitting lenses 133a, and the plurality of first shields 135a described above.

A protrusion portion 137a that protrudes upward may be formed on a portion of the upper end of each of the plurality of second shields 135b, and the protrusion portion 137a may prevent causing glare to the driver of the vehicle in front.

Among the above-described plurality of lamp modules 100, 200, 300, 400, 500, and 600, the lamp modules 100, 200, and 300 included in the first lamp unit 10 and the lamp modules 400, 500, and 600 included in the second lamp unit 20 may be configured such that a plurality of incident lenses have different focal lengths. Such configuration is because regions formed in the beam pattern by each of the first and second lamp units 10 and 20 are different from each other.

For example, the plurality of incident lenses of the lamp modules 100, 200, and 300 included in the first lamp unit 10 may have a longer focal length than a plurality of emitting lenses of the lamp modules 100, 200, and 300 included in the first lamp unit 10. On the other hand, in the lamp modules 400, 500, and 600 included in the second lamp unit 10, the plurality of incident lenses and the plurality of emitting lenses may have substantially equal focal lengths.

Figure 14:
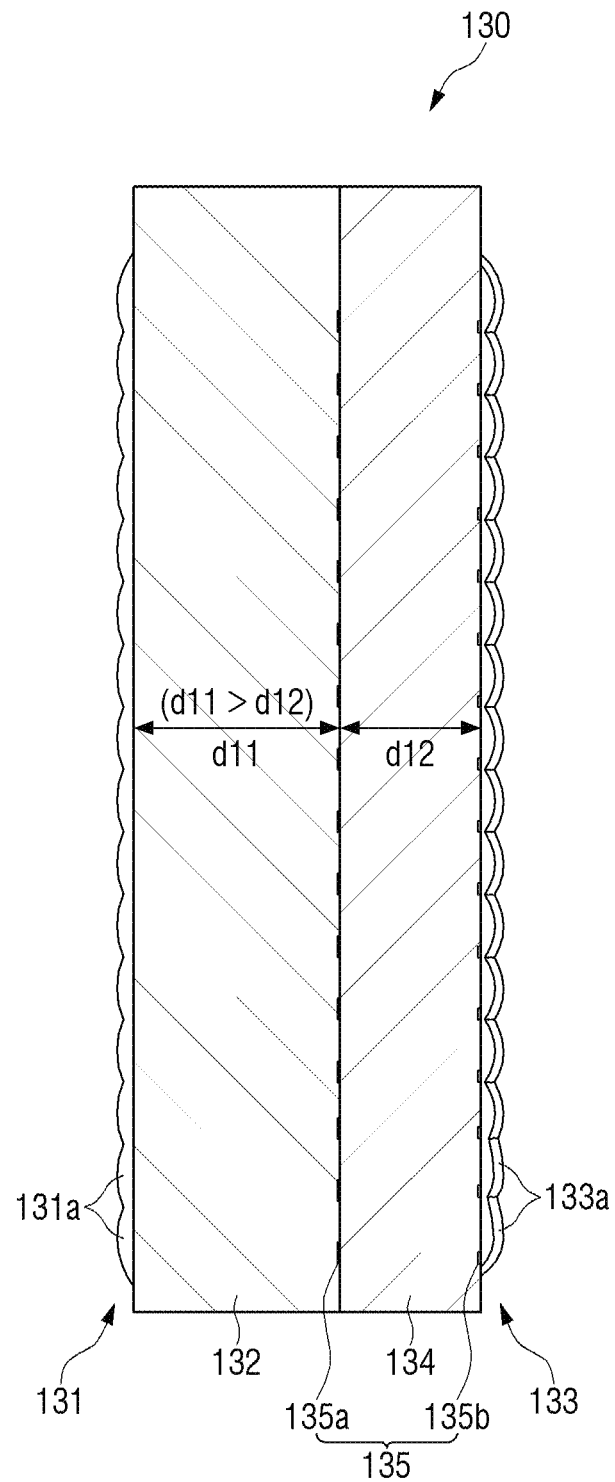
FIGS. 14 and 15 are cross-sectional views illustrating a lens unit according to an exemplary embodiment of the present disclosure.
Figure 15:
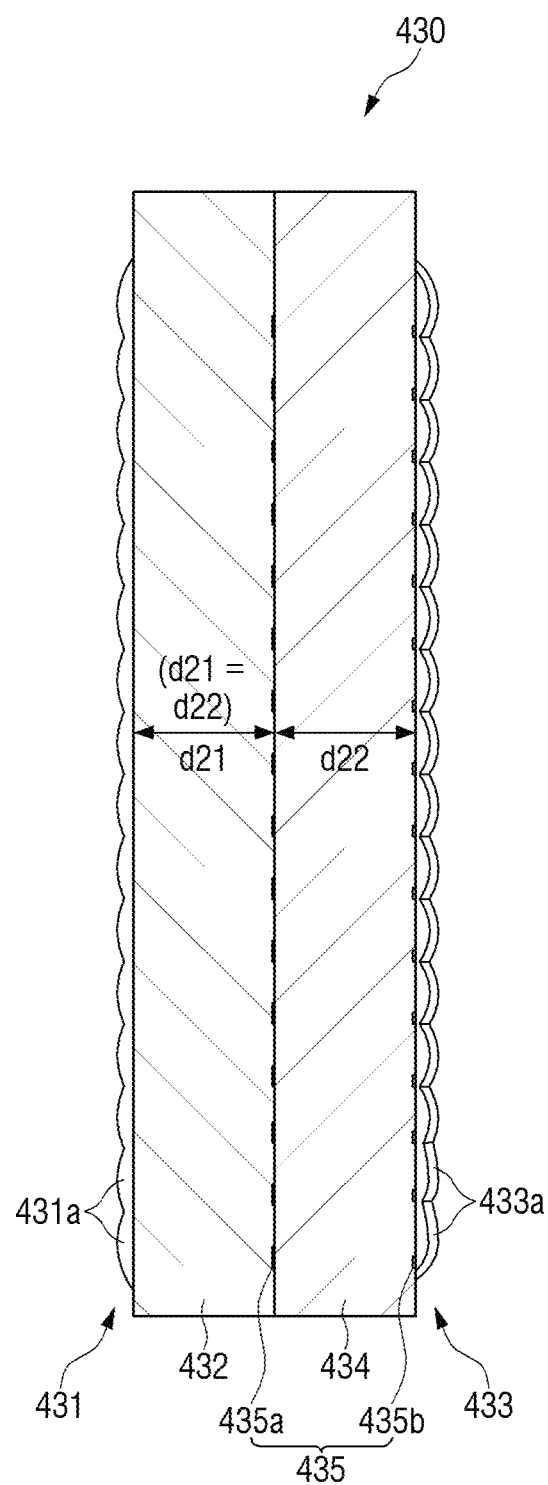

FIG. 14 is a schematic diagram illustrating a lens unit of a lamp module included in a first lamp unit according to an exemplary embodiment of the present disclosure, and FIG. 15 is a schematic diagram illustrating a lens unit of a lamp module included in a second lamp unit according to an exemplary embodiment of the present disclosure. FIG. 14 shows an example of the first lamp module 100 of the first lamp unit, and FIG. 15 shows an example of the fourth lamp module 400 of the second lamp unit, for illustration.

Referring to FIG. 14, as described above, the lens unit 130 of the first lamp module 100 may include the incident lens unit 131 including the plurality of incident lenses 131a, the first optical unit 132 in which the incident lens unit 131 is formed on the incident surface thereof, the emitting lens unit 133 including the plurality of emitting lenses 133a, the second optical unit 134 disposed so that the surfaces facing the first optical unit 132 are in contact therewith, in which the emitting lens unit 133 is formed on the emitting surface thereof. Further, the shield unit 135 including the plurality of first shields 135a and the plurality of second shields 135b respectively formed on the incident surface and the emitting surface of the second optical unit 134 may also be included in the lens unit 130.

Referring to FIG. 15, similar to the first lamp module 100, the lens unit 430 of the fourth lamp module 400 may include the incident lens unit 431 including the plurality of incident lenses 431a, the first optical unit 432 in which the incident lens unit 431 is formed on the incident surface thereof, the emitting lens unit 433 including the plurality of emitting lenses 433a, the second optical unit 434 disposed so that the surfaces facing the first optical unit 432 are in contact with each other, in which the emitting lens unit 433 is formed on the emitting surface thereof. Further, the shield unit 435 including the plurality of first shields 435a and the plurality of second shields 435b respectively formed on the incident surface and the emitting surface of the second optical unit 434 may also be included in the lens unit 430.

Referring to FIGS. 14 and 15, the thickness d11 along the front-rear direction of the first optical unit 132 of the first lamp module 100 may be greater than the thickness d12 of the second optical unit 134, and the thickness d21 along the front-rear direction of the first optical unit 432 of the fourth lamp module 400 may be substantially equal to the thickness d22 of the second optical unit 434. Due to this configuration, the first lamp unit 10 may form the spread region with a relatively low luminous intensity but with a wider irradiation range, and the second lamp unit 20 may form a high illuminance region where the light is more concentrated.

Since the thickness d11 of the first optical unit 132 is greater than the thickness d12 of the second optical unit 134 in the first lamp module 100, the curvature of the plurality of incident lenses 131a may be smaller than the curvature of the plurality of emitting lenses 133a so that the focal lengths of the plurality of incident lenses 131a are longer, and thus, the plurality of incident lenses 131a may be flatter than the plurality of emitting lenses 133a. Since the thickness d21 of the first optical unit 432 and the thickness d22 of the second optical unit 434 are the same, the fourth lamp module 400 may be formed so that the plurality of incident lenses 431a and the plurality of output lenses 433a have substantially the same curvature.

As described above, in the vehicle lamp 1 of the present disclosure, the region formed by the light emitted from the plurality of emitting lenses in the beam pattern can be controlled by adjusting the focal lengths of the plurality of incident lenses, so that the beam pattern can be more easily formed.

The light sources of each of the first to sixth lamp modules 100, 200, 300, 400, 500 and 600 may be disposed on or below an extension line passing through the rear focal point of the light path adjusting unit in the left-right direction, and the light sources of the first to third lamp modules 100, 200, and 300 forming the spread region P1 may be disposed lower than the light sources of the fourth to sixth lamp modules 400, 500, and 600 forming the high illuminance region P2.

For example, in the exemplary embodiment of the present disclosure, the light sources of the fourth to sixth lamp modules 400, 500, and 600 may be disposed on or near the lower side of an extension line passing through the rear focal point of the light path adjusting unit in the left-right direction, and the light sources of the first to third lamp modules 100, 200, and 300 may be disposed lower than the light sources of the fourth to sixth lamp modules 400, 500, and 600. Due to this configuration, the fourth to sixth lamp modules 400, 500, and 600 may improve the concentration of light so that the high illuminance region P2 has sufficient brightness, while the first to third lamp modules 100, 200, and 300 may allow the light to spread relatively more so that the spread characteristics are improved.

In the vehicle lamp 1 of the present disclosure described above, the light irradiation regions formed by each of the first to third lamp modules 100, 200, and 300 may be combined to collectively form a spread region of the beam pattern, and the light irradiation regions formed by each of the lamp modules 400, 500, and 600 may be combined to collectively form a high illuminance region of the beam pattern.

Figure 16:
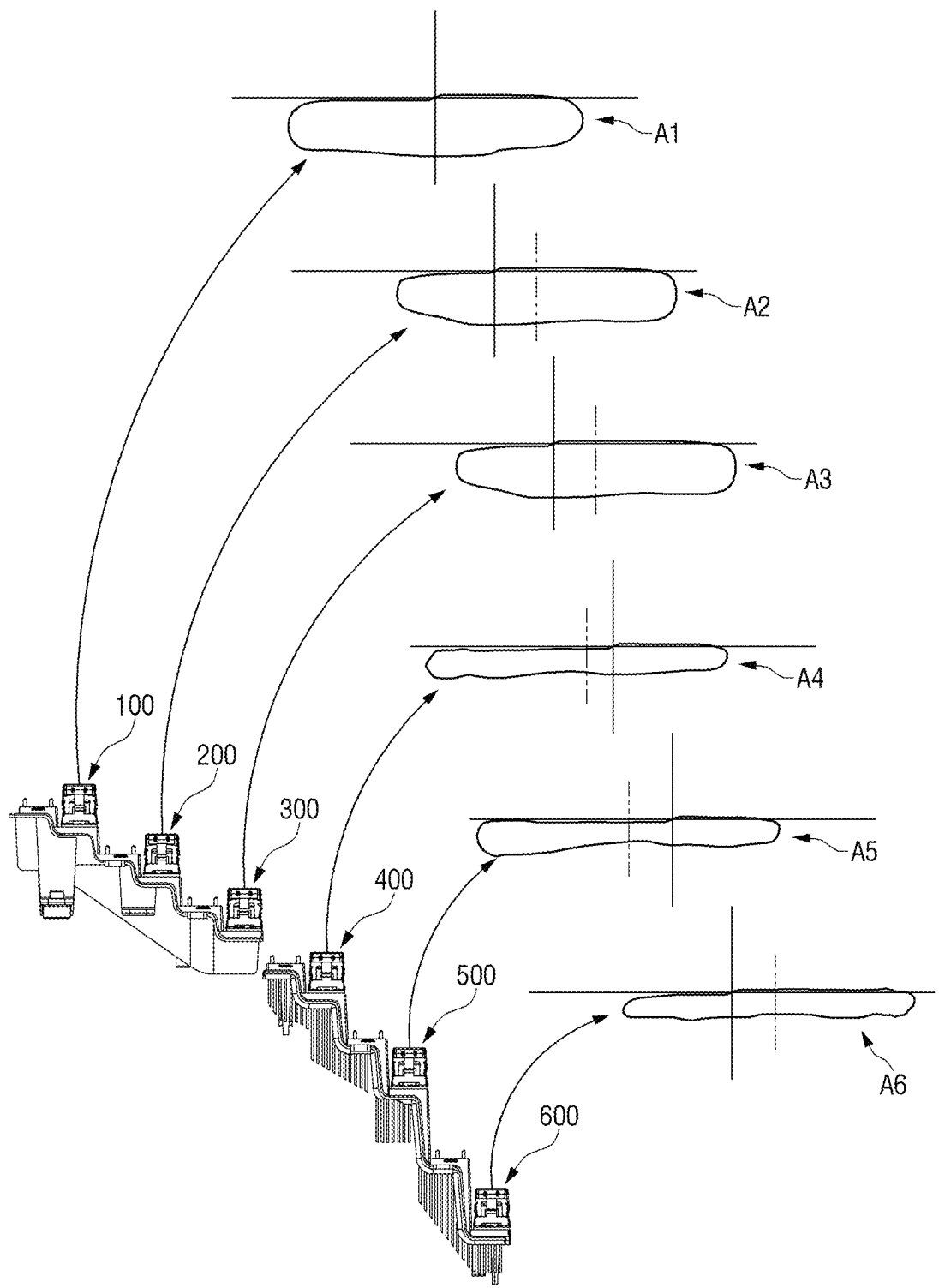
FIG. 16 is a schematic view showing a light irradiation region formed by a right head lamp according to an exemplary embodiment of the present disclosure.

FIG. 16 is a schematic diagram illustrating a light irradiation region formed by each of a plurality of lamp modules according to an exemplary embodiment of the present disclosure. Referring to FIG. 16, the spread region may be formed by the first lamp unit 10 by combining light irradiation regions A1, A2, and A3 formed by each of the first to third lamp modules 100, 200 and 300, and similarly, the high illuminance region may be formed by the second lamp unit 20 by combining light irradiation regions A4, A5, and A6 formed by each of the fourth to sixth lamp modules 400, 500, and 600.

In the first lamp unit 10, the first light irradiation region A1 forming the center of the spread region may be formed by the first lamp module 100, and the second and third light irradiation regions A2 and A3 formed by the second and third lamp modules 200 and 300 may expand the center of the spread region formed by the first lamp module 100, that is, the first light irradiation region A1 in the left-right direction. The description that the second and third light irradiation regions A2 and A3 expand the first light irradiation region A1 in the left-right direction may be understood that the first light irradiation region A1 is expanded in at least one direction of both sides in the left-right direction with respect to the first light irradiation region A1.

The centers of the second and third light irradiation regions A2 and A3 may be disposed on the same side with respect to the center of the first light irradiation region A1, and in the exemplary embodiment of the present disclosure, a case in which the centers of the light irradiation regions A2 and A3 are disposed in the outer side of the vehicle with respect to the center of the first light irradiation region A1 will be described as an example. Herein, the center of the light irradiation region may refer to the center of the light irradiation region in the left-right direction.

The configuration that the centers of the second and third light irradiation regions A2 and A3 are disposed in the outer side of a vehicle with respect to the center of the first light irradiation region A1 may prevent an incomplete lamp image from forming as a whole since the brightness of the image formed by the light irradiated from at least one of the second and third modules 200 and 300 is relatively dimmer when viewed from the side of the vehicle.

In other words, in general, the centers of the second and third light irradiation regions A2 and A3 may be disposed on both sides with respect to the center of the first light irradiation region A1, respectively, so that the light distribution performance in the left-right direction of the spread region may be satisfied. However, in this case, when viewed from the side of the vehicle, the brightness of the light irradiation region disposed on a relative inner side of the vehicle among the second and third light irradiation regions A2 and A3 decreases.

Figure 17:
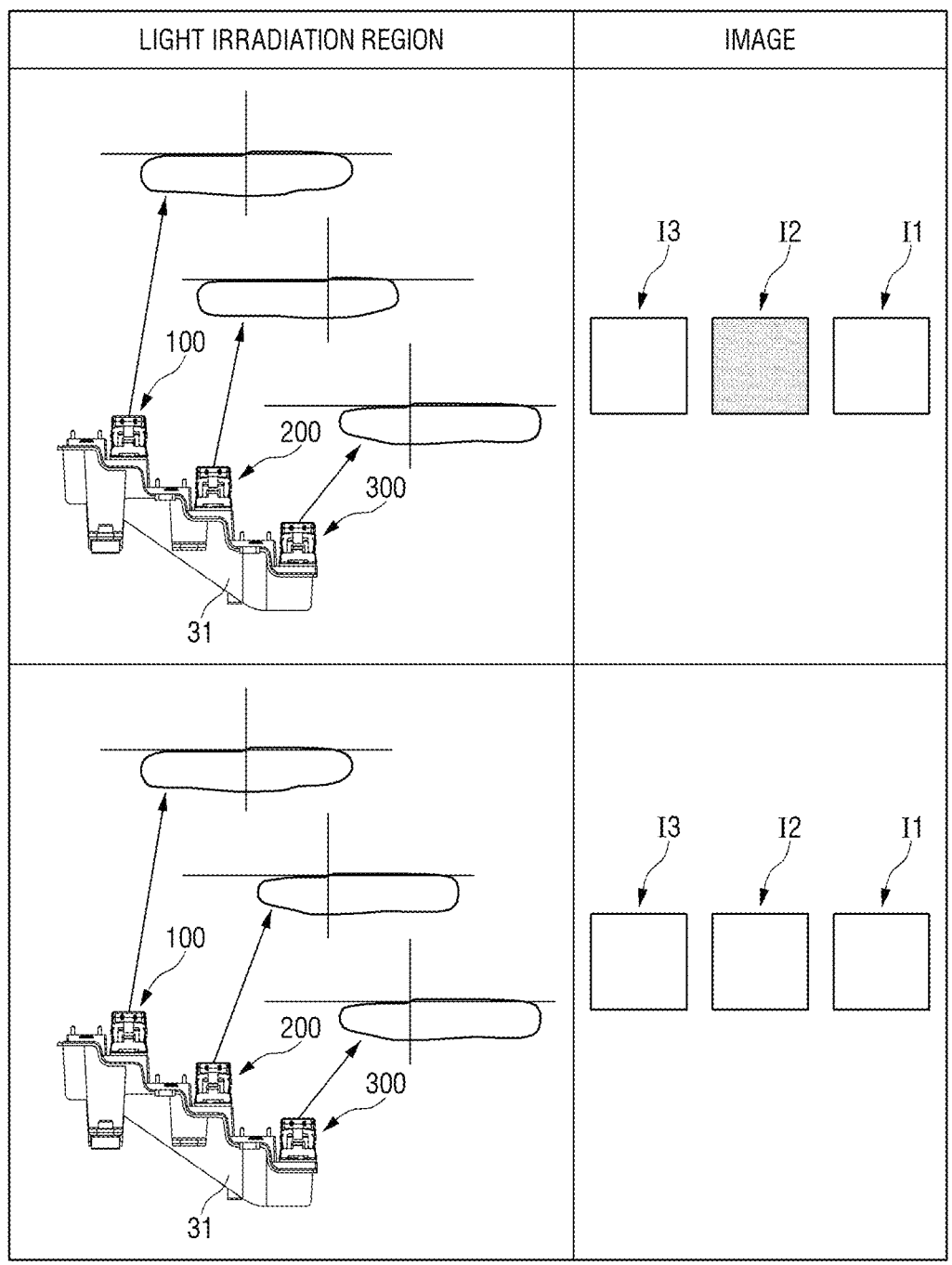
FIG. 17 is a schematic diagram showing the brightness of an image for each formation position of a light irradiation region according to an exemplary embodiment of the present disclosure.

For example, in a configuration where the center of the second light irradiation region A2 is disposed in the inward direction of the vehicle with respect to the center of the first light irradiation region A1, and the center of the third light irradiation region A3 is disposed in the outward direction of the vehicle with respect to the center of the first light irradiation region A1, when the vehicle lamp 1 of the present disclosure is viewed from the right diagonal direction in front of the vehicle, as shown in FIG. 17, the brightness of the image I2 formed by the second lamp module 200 would appear relatively darker compared to the images I1 and I3 respectively formed by the first and third lamp modules 100 and 300. On the other hand, in the exemplary embodiment of the present disclosure, since the centers of the second and third light irradiation regions A2 and A3 are disposed in the outward direction of the vehicle with respect to the center of the first light irradiation region A1, when viewed from the right diagonal direction in front of the vehicle, the images I1, I2, and I3 formed by the first to third lamp modules 100, 200, and 300 have approximately similar brightness. Therefore, visibility for the vehicle lamp 1 of the present disclosure can be improved when viewed from around the vehicle.

Meanwhile, in the second lamp unit 20, the fourth light irradiation region A4 forming the center of the high illuminance region may be formed by the fourth lamp module 400, and the fifth and sixth light irradiation regions A2 and A3 formed by the fifth and sixth lamp modules 500 and 600 may expand the center of the high illuminance region formed by the fourth lamp module 400, that is, the fourth light irradiation region A4, in the left-right direction. In this case, it can be seen that the centers of the fifth and sixth light irradiation regions A5 and A6 are respectively disposed on both sides with respect to the center of the fourth light irradiation region A4, unlike the aforementioned second and third light irradiation regions A2 and A3. This is because the brightness of the images formed by the first to sixth lamp modules 100, 200, 300, 400, 500, and 600 is merely dimmer overall, but they have rather uniform brightness as a whole when the second lamp unit 20 is viewed from the side of the vehicle rather than from the front of the vehicle. Therefore, a phenomenon where the brightness of the image formed by a specific lamp module among the first to sixth lamp modules 100, 200, 300, 400, 500, and 600 is relatively dimmer would be less of a concern.

In the exemplary embodiment of the present disclosure, a case in which the centers of the fifth and sixth light irradiation regions A5 and A6 are disposed on both sides with respect to the center of the fourth light irradiation region A4 is described as an example. However, the present disclosure is limited thereto. When the brightness of the image formed by the light generated by any one of the fifth or the sixth lamp modules 500 and 600 is relatively darker depending on the layout or design considerations of the vehicle lamp 1 of the present disclosure, similar to the above-described second and third light irradiation regions A2 and A3, the centers of the fifth and sixth light irradiation regions A5 and A6 may be disposed in the outward side of the vehicle with respect to the fourth light irradiation region A4.

In addition, in the above-described exemplary embodiment, the centers of the second and third light irradiation regions A2 and A3 are disposed in the outward side (i.e., the right side) of the vehicle with respect to the center of the first light irradiation region A1. This is because the vehicle lamp 1 of the present disclosure is described with reference to a right head lamp. For a left head lamp, the centers of the second and third light irradiation regions A2 and A3 may be disposed in the outward side (i.e., the left side) of the vehicle with respect to the first light irradiation region A1.

On the other hand, when the centers of the second and third light irradiation regions A2 and A3 are disposed in the same side with respect to the center of the first light irradiation region A1, that is, in the outward side of the vehicle, the light distribution performance of the left side may be seemingly deteriorated compared to the right side of the spread region. However, since the vehicle lamp 1 of the present disclosure is installed on both sides of the front of the vehicle, the spread region can have uniform light distribution performance in the left-right direction overall.

Figure 18:
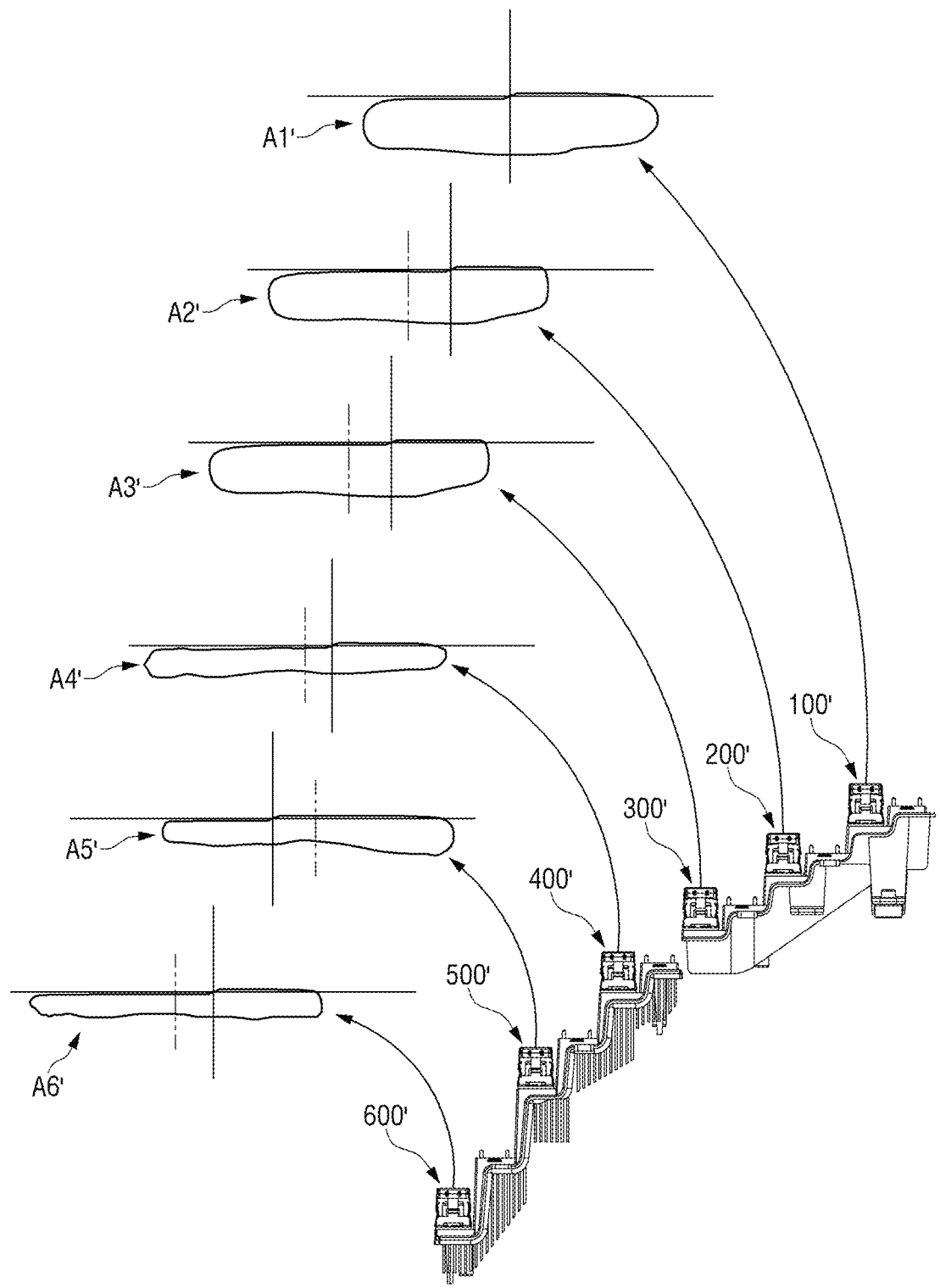
FIG. 18 is a schematic view showing a light irradiation region formed by a left head lamp according to an exemplary embodiment of the present disclosure.

In other words, in the exemplary embodiment of the present disclosure, since the vehicle lamp 1 is described as a right head lamp, the centers of the second and third light irradiation regions A2 and A3 may be disposed on the right side with respect to the first light irradiation region A1. However, for the left head lamp, as shown in FIG. 18, the centers of light irradiation regions A2' and A3' corresponding to the second and third light irradiation regions A2 and A3 may be disposed on the left side with respect to the center of the light irradiation region A1' corresponding to the first light irradiation region A1, so that the entire spread region formed by both the right head lamp and the left head lamp can have uniform light distribution performance along the left-right direction.

In particular, the left head lamp may also include a plurality of lamp modules 100', 200', 300', 400', 500', and 600', like the first to sixth lamp modules 100, 200, 300, 400, 500, and 600 described above, and light irradiation regions A1', A2', A3', A4', A5', and A6 for forming a spread region and a high illuminance region may be formed by each lamp module 100', 200', 300', 400', 500', and 600'.

Figure 20:
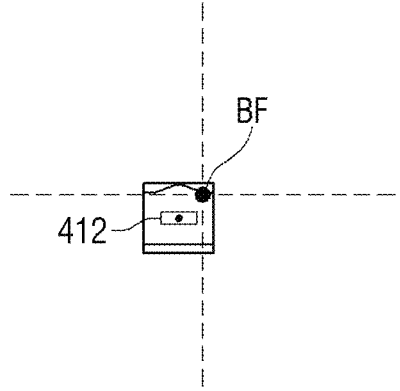
Figure 20:
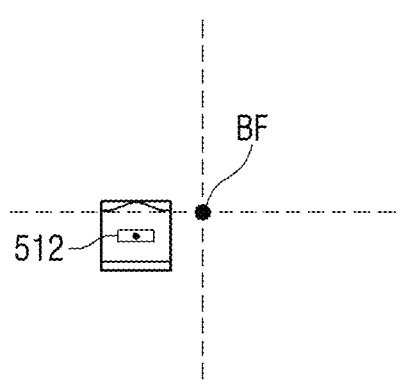
Figure 20:
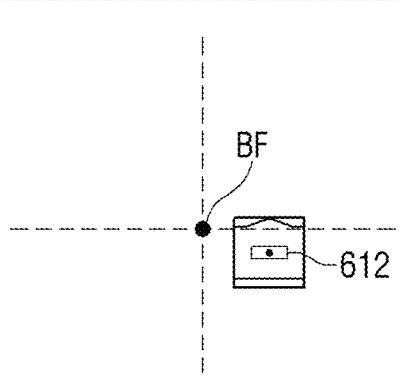
Figure 21:
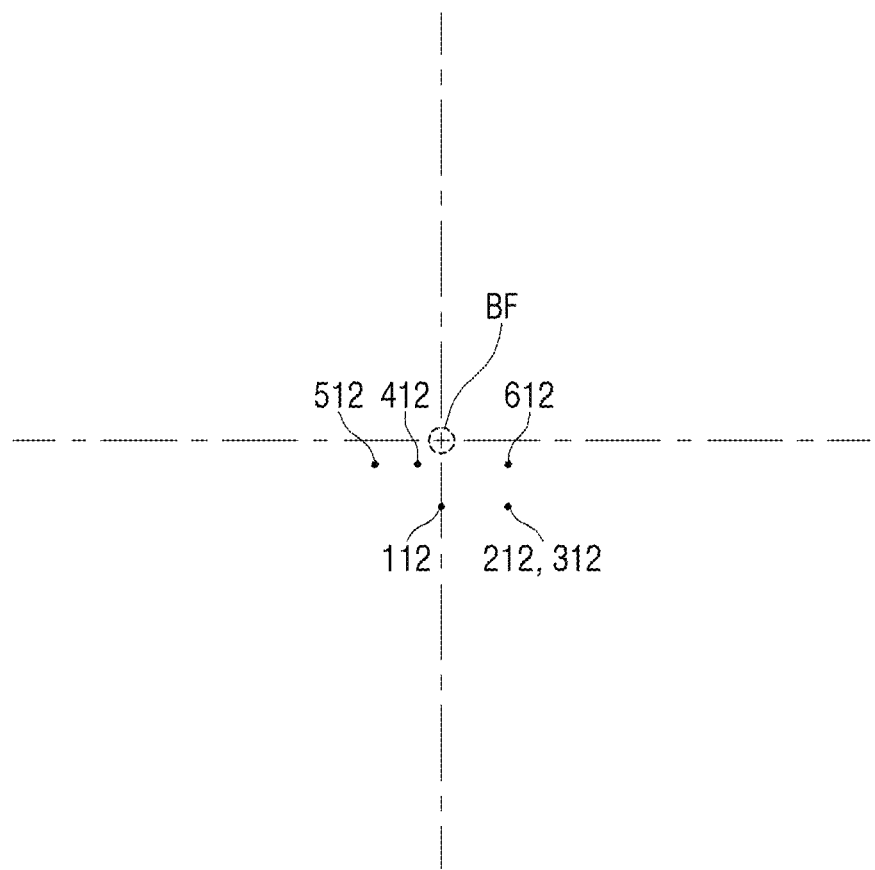

FIG. 19 is a schematic diagram showing the positions of the light sources of the first to third lamp modules according to an exemplary embodiment of the present disclosure, and FIG. 20 is a schematic diagram showing the positions of the light sources of the fourth to sixth lamp modules according to the exemplary embodiment of the present disclosure. and FIG. 21 is a schematic diagram showing the centers of the light sources of the first to sixth lamp modules with respect to the rear focal point of the light path adjusting unit according to an exemplary embodiment of the present disclosure.

Referring to FIG. 19, the light source 112 of the first lamp module 100 arranged at the innermost side among the first to third lamp modules 100, 200, and 300 may be disposed on the extension line passing in the vertical direction through the rear focal point BF of the light path adjusting unit, and the light sources 212 and 312 of each of the second and third lamp modules 200 and 300 may be spaced apart from each other by a predetermined interval on any one of both sides of the light source 112 of the first lamp module 100.

In particular, FIG. 19 is an example where the position of the light source is shown when viewing the light source unit 110 from the light path adjusting unit 120. It can be understood that the light sources 212 and 312 of each of the second and third lamp modules 200 and 300 may be disposed on the right side with respect to the light source 112 of the first lamp module 100 so that the centers of the second and third light irradiation regions A2 and A3 are disposed on the right side of the first light irradiation region A1. This is because, when an aspherical lens is used as the plurality of incident lenses 131*a* and the plurality of emitting lenses 133*a*, the light generated from the light source unit 110 may be irradiated in an inverse image.

Referring to FIG. 20, the light sources 412, 512, and 612 of the fourth to sixth lamp modules 400, 500, and 600 may be disposed higher than the light sources 112, 212, and 312 of the first to third lamp modules 100, 200, and 300, and the light sources 512 and 612 of the fifth and sixth lamp modules 500 and 600 may be spaced apart by predetermined intervals on both sides of the light source 412 of the fourth lamp module 400, respectively.

In the exemplary embodiment of the present disclosure, the case in which the light source 412 of the fourth lamp module 400 is disposed on the left side with respect to the rear focal point BF of the light path adjusting unit 120 is described as an example. The configuration may allow a common usage of the vehicle lamp 1 of the present disclosure in regions or countries having a similar position of the center of the high illuminance region even though the beam pattern may be changed depending on the local rules and/or practices. However, the present disclosure is not limited thereto, and the light source 412 of the fourth lamp module 400 may alternatively be disposed on an extension line passing through the rear focal point BF of the light path adjusting unit in the vertical direction, similar to the light source 112 of the first lamp module 100 described above.

As described above, the vehicle lamp 1 of the present disclosure may adjust the position of a light source of at least one of the plurality of lamp modules 100, 200, 300, 400, 500, and 600 and may prevent the image formed by the light irradiated from at least one of the plurality of lamp modules 100, 200, 300, 400, 500, and 600 from appearing relatively dimmer depending on the viewing direction of the vehicle lamp 1 of the present disclosure around the vehicle, whereby an incomplete lamp image may be prevented, and thus, the visibility may be more uniformly maintained around the vehicle.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle comprising:
a first lamp unit for forming a first region of a beam pattern; and
a second lamp unit for forming a second region of the beam pattern, the second lamp unit being arranged in a left-right direction with the first lamp unit,
wherein each of the first lamp unit and the second lamp unit includes a plurality of lamp modules arranged in the left-right direction,
wherein each of the plurality of lamp modules includes a light source unit including a light source for generating light; and a light path adjusting unit for adjusting a path of the light generated from the light source unit,
wherein a position of light irradiation region formed by the light emitted from each of the plurality of lamp modules is configured depending on a position of the light source with respect to a rear focal point of the light path adjusting unit,
wherein, in the first lamp unit, centers of light irradiation regions formed by all of the plurality of lamp modules are disposed either on the rear focal point of the light path adjusting unit or on a same side with respect to the rear focal point of the light path adjusting unit in the left-right direction, and
wherein, in the second lamp unit, a center of a light irradiation region formed by at least one of the plurality of lamp modules and a center of a light irradiation region formed by at least one other of the plurality of lamp modules are respectively disposed on different sides with respect to the rear focal point of the light path adjusting unit in the left-right direction.

2. The vehicle lamp of claim 1, wherein any one of the first lamp unit or the second lamp unit forms a high illuminance region of the beam pattern, and the other thereof forms a spread region that allows the high illuminance region to expand in at least one of a vertical direction or the left-right direction.

3. The vehicle lamp of claim 1, wherein the first lamp unit is disposed on an inward side of the vehicle compared to the second lamp unit along the left-right direction.

4. The vehicle lamp of claim 1, wherein the first lamp unit is disposed more forward compared to the second lamp unit.

5. The vehicle lamp of claim 1, wherein, in each of the first lamp unit and the second lamp unit, the plurality of lamp modules are disposed gradually rearward as they go from an inward side of the vehicle to an outward side of the vehicle along the left-right direction.

6. The vehicle lamp of claim 1, wherein, in the first lamp unit, centers of the light sources of all of the lamp modules are disposed either on an extension line passing in a vertical direction through the rear focal point of the light path adjusting unit or in an outward side of the vehicle among both sides of the extension line in the left-right direction.

7. The vehicle lamp of claim 1, wherein, in the second lamp unit, a center of a light source of at least one lamp module is disposed in an inward side of the vehicle with respect to an extension line passing in a vertical direction through the rear focal point of the light path adjusting unit, and wherein a center of a light source of at least one other lamp module is disposed in an outward side of the vehicle with respect to the extension line.

8. The vehicle lamp of claim 1, wherein, in the plurality of lamp modules of each of the first lamp unit and the second lamp unit, the light sources are disposed at or below the rear focal point of the light path adjusting unit.

9. The vehicle lamp of claim 1, wherein a light source of a lamp module of any one of the first lamp unit or the second lamp unit is disposed lower than a light source of another lamp module of the other of the first lamp unit or the second lamp unit.

10. The vehicle lamp of claim 1, wherein the light sources of the plurality of lamp modules of the first lamp unit are disposed lower than the light sources of the plurality of lamp modules of the second lamp unit.

\* \* \* \* \*